(12) United States Patent
Lengauer

(10) Patent No.: US 12,475,044 B2
(45) Date of Patent: Nov. 18, 2025

(54) METHOD AND SYSTEM FOR ESTIMATING GARBAGE COLLECTION SUSPENSION CONTRIBUTIONS OF INDIVIDUAL ALLOCATION SITES

(71) Applicant: Dynatrace LLC, Waltham, MA (US)

(72) Inventor: Philipp Lengauer, Steyregg (AT)

(73) Assignee: Dynatrace LLC, Boston, MA (US)

( * ) Notice: Subject to any disclaimer, the term of this patent is extended or adjusted under 35 U.S.C. 154(b) by 247 days.

(21) Appl. No.: 17/496,949

(22) Filed: Oct. 8, 2021

(65) Prior Publication Data

US 2022/0114092 A1 Apr. 14, 2022

Related U.S. Application Data

(60) Provisional application No. 63/090,921, filed on Oct. 13, 2020.

(51) Int. Cl.
  *G06F 15/16* (2006.01)
  *G06F 12/02* (2006.01)

(52) U.S. Cl.
  CPC .... *G06F 12/0269* (2013.01); *G06F 2212/702* (2013.01)

(58) Field of Classification Search
  None
  See application file for complete search history.

(56) References Cited

U.S. PATENT DOCUMENTS 6,658,652 B1 * 12/2003 Alexander, III ...... G06F 11/366
                                                        711/6
7,313,661 B1    12/2007 Dmitriev
                          (Continued)

FOREIGN PATENT DOCUMENTS

CN         107797934 A      3/2018

OTHER PUBLICATIONS

Aggregate Function. 2018, pp. 1-3. https://www.investopedia.com/terms/a/aggregate-function.asp (Year: 2018).*
(Continued)

*Primary Examiner* — Alex Gofman
*Assistant Examiner* — Shelly X Qian

(57) ABSTRACT

A technology is disclosed for estimating the impact that heap memory allocations have on the behavior of garbage collection activities. A sampling mechanism randomly and unbiased selects a subset of allocations for detailed analysis. A detailed analysis is performed for the selected allocation activities. Allocation monitoring data, including type and size of the allocated object and data describing the code location on which the allocation was performed are gathered. Further, the point in time, when the allocated object is later reclaimed by garbage collection is recorded. Gathered object allocation and reclaim data are used to estimate for individual allocation sites or types of allocated objects, the number of bytes that are allocated, and the number of bytes that survived a garbage collection run. Allocation activity causing frequently garbage collection runs is identified using allocation size data and the survived byte counts are used to identify allocation activity causing long garbage collection runs. Further allocation monitoring data is correlated with transaction trace data to identify the impact of transactions or transaction classes on garbage collection behavior.

24 Claims, 11 Drawing Sheets

(56) References Cited

U.S. PATENT DOCUMENTS

| | | | | |
|---|---|---|---|---|
| 9,460,389 B1* | 10/2016 | Botelho | ............. | G06F 12/0253 |
| 2002/0138506 A1* | 9/2002 | Shuf | ................... | G06F 12/0269 |
| 2006/0206885 A1 | 9/2006 | Seidman et al. | | |
| 2007/0016672 A1* | 1/2007 | Wilson | ................. | H04L 67/535 |
| | | | | 709/224 |
| 2019/0391891 A1* | 12/2019 | Gupta | ................... | G06N 3/043 |

OTHER PUBLICATIONS

Office Action received in corresponding European patent application No. 241608140, dated May 8, 2025.

\* cited by examiner

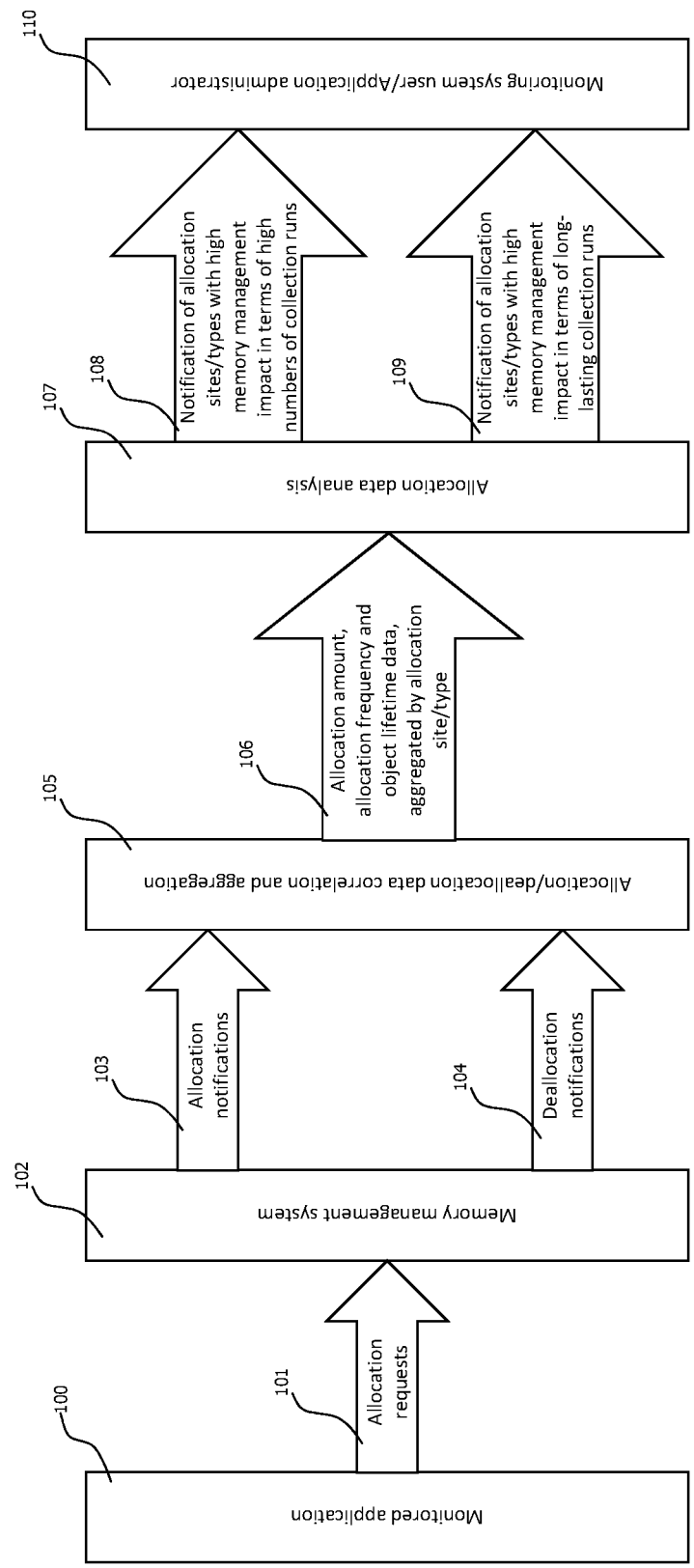

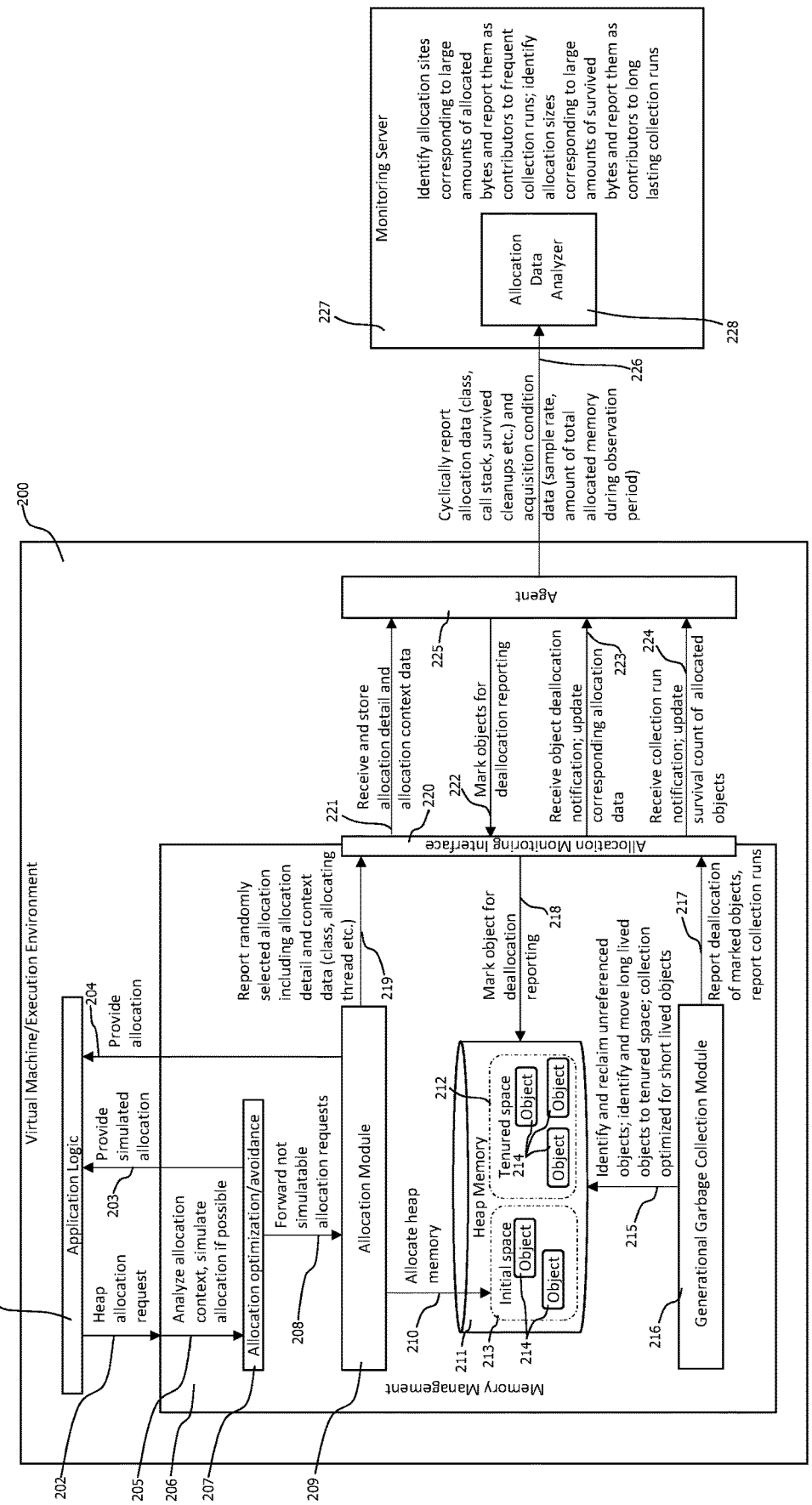

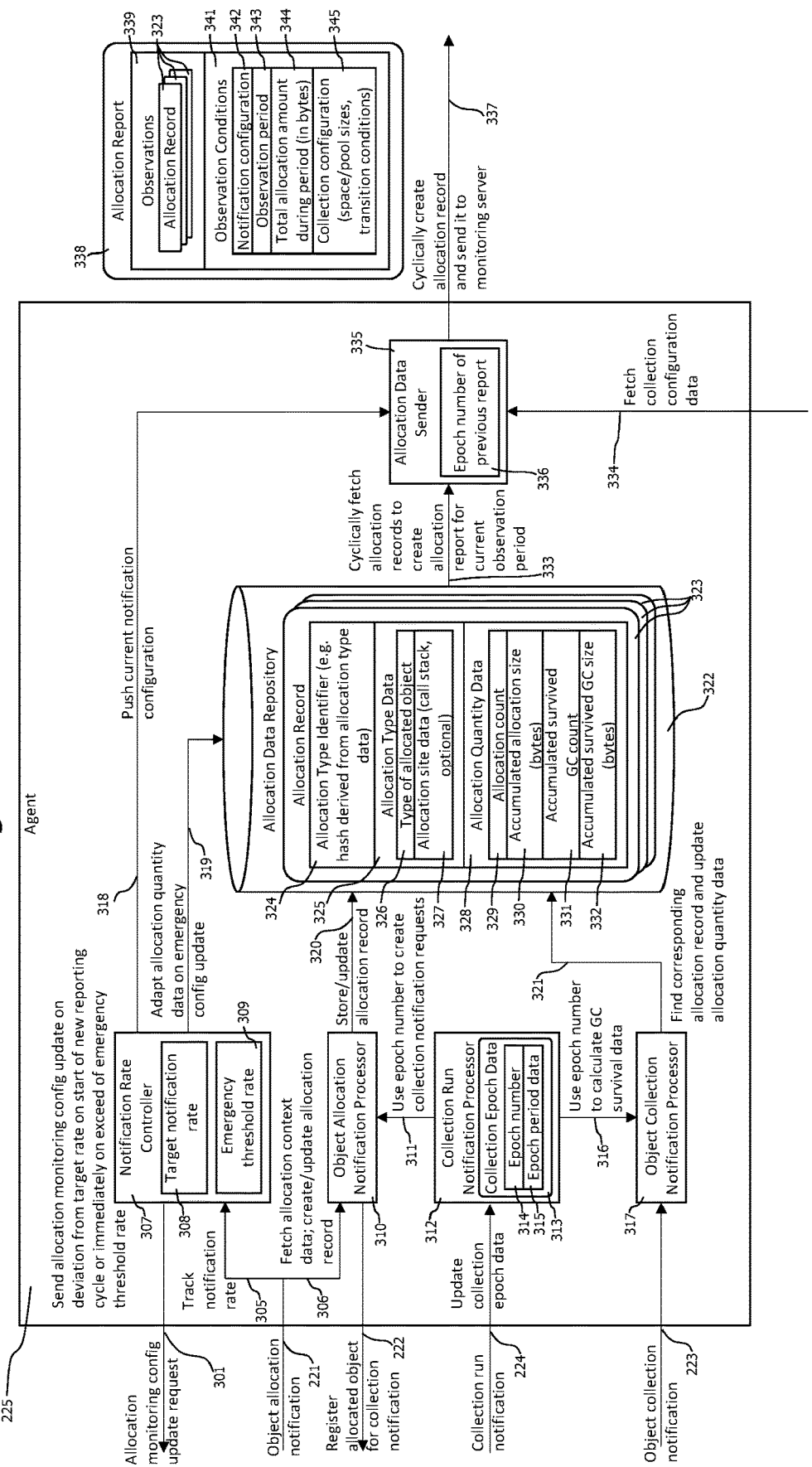

FIG 4: Allocation Monitoring Notification and Configuration Records

FIG 4a: Object Allocation Notification Record

- 400 Allocation Notification
- 401 Object reference
- 402 Type reference
- 403 Allocation size (bytes)
- 404 Allocation context reference (e.g. allocating thread, call stack, optional)

FIG 4b: Object Deallocation Notification Request Record

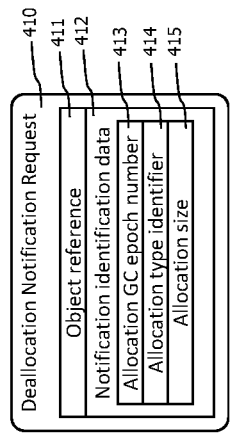

- 410 Deallocation Notification Request
- 411 Object reference
- 412 Notification identification data
- 413 Allocation GC epoch number
- 414 Allocation type identifier
- 415 Allocation size

FIG 4c: Object Deallocation Notification Record

- 420 Deallocation Notification
- 421 Notification identification data

FIG 4d: Collection Run Notification Record

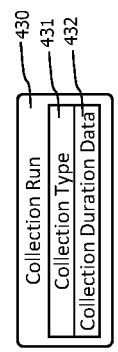

- 430 Collection Run
- 431 Collection Type
- 432 Collection Duration Data

FIG 4e: Allocation Notification Configuration Change Request Record

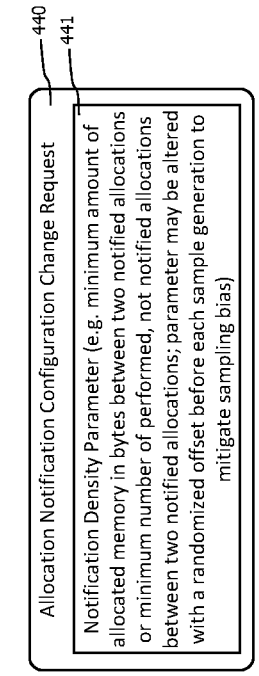

- 440 Allocation Notification Configuration Change Request
- 441 Notification Density Parameter (e.g. minimum amount of allocated memory in bytes between two notified allocations or minimum number of performed, not notified allocations between two notified allocations; parameter may be altered with a randomized offset before each sample generation to mitigate sampling bias)

FIG 5: Allocation Notification Processing
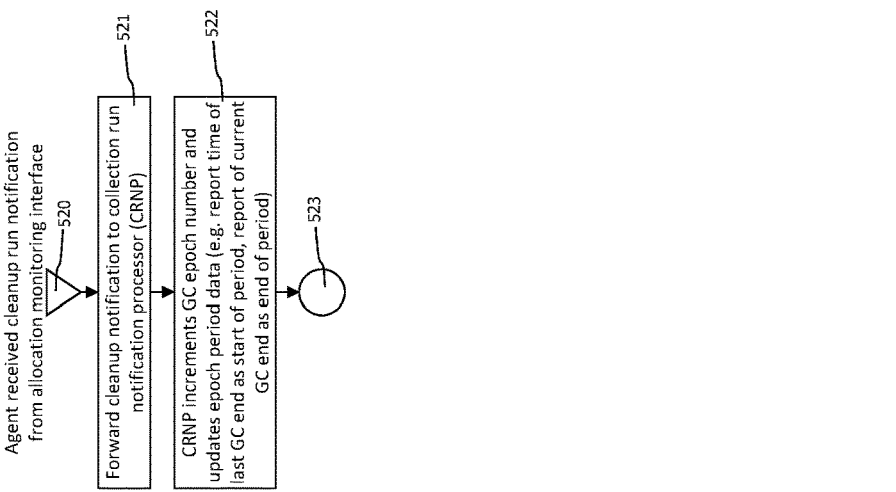
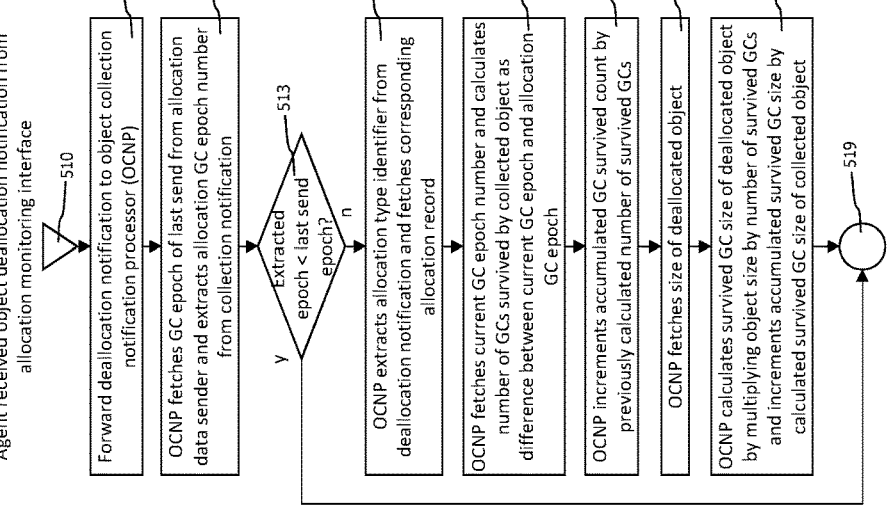
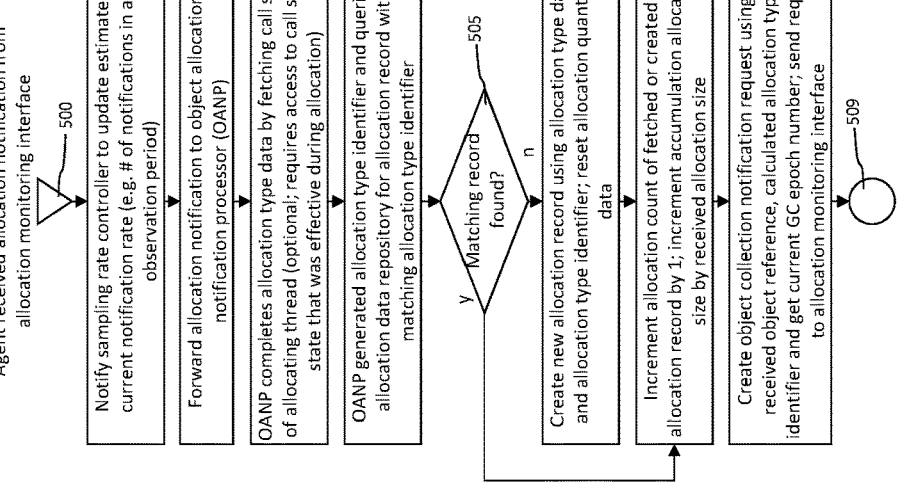

FIG 6: Notification Rate Controlling Process
FIG 6a: Conventional Adjustment of Allocation Notification Rate
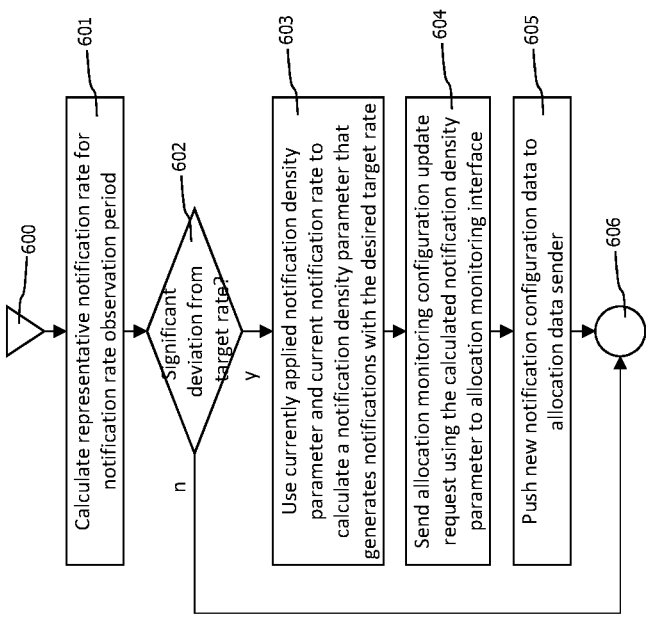
FIG 6b: Emergency Adjustment of Allocation Notification Rate
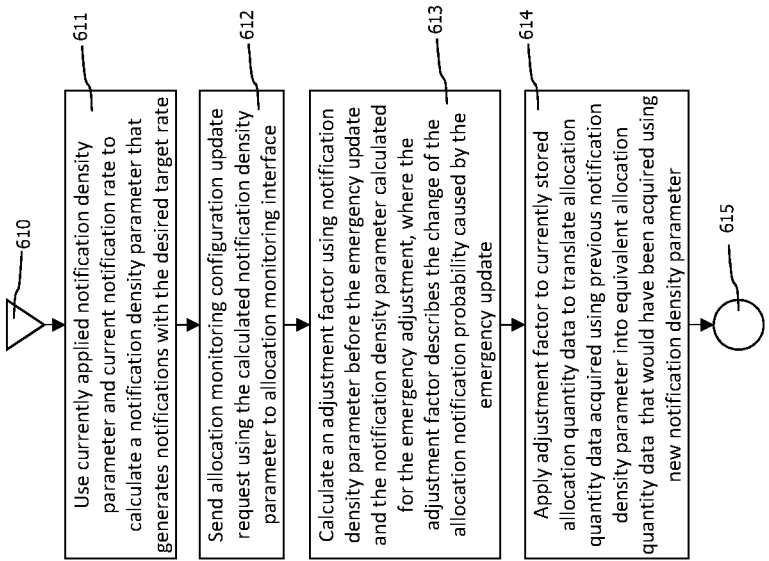

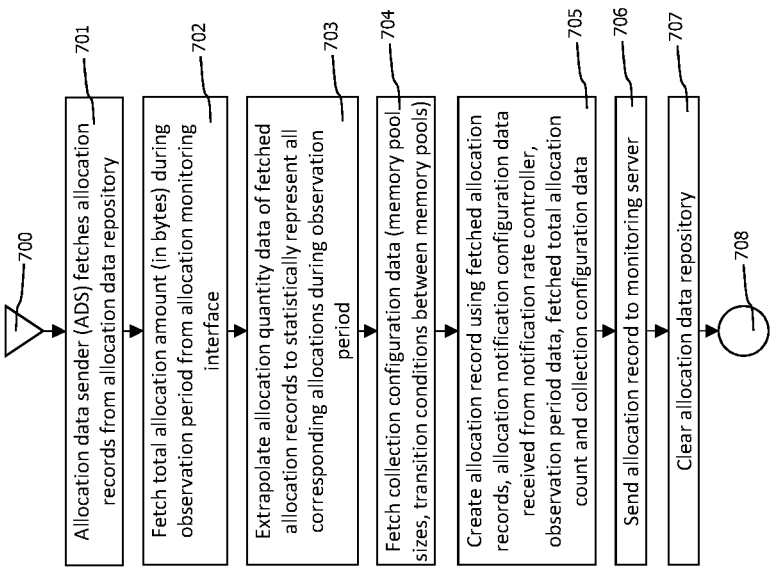

FIG 8: Exemplary Allocation Data Analyses

FIG 8a: Identification of Allocation Sites Contributing to Frequent Garbage Collection Runs Allocation data analyzer receives request to analyze reasons for unexpectedly high number of GC runs on a specific process, during a specific time period

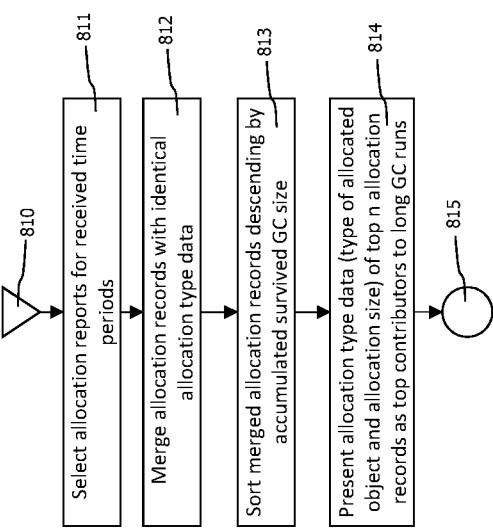

FIG 8b: Identification of Allocation Sites Contributing to Long Garbage Collection Runs Allocation data analyzer receives request to analyze reasons for unexpectedly long GC runs during a specific time period on a specific process.

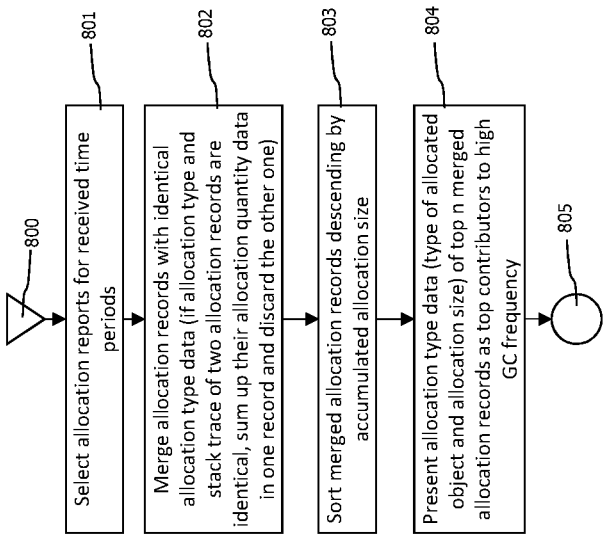

FIG 9: Transaction Context Integration – Allocation Notification Triggered
FIG 9a: Sensor Architecture
FIG 9b: Extended Allocation Notification Processing
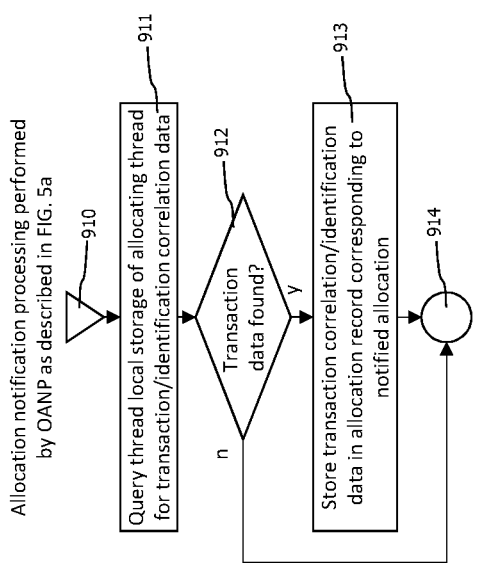
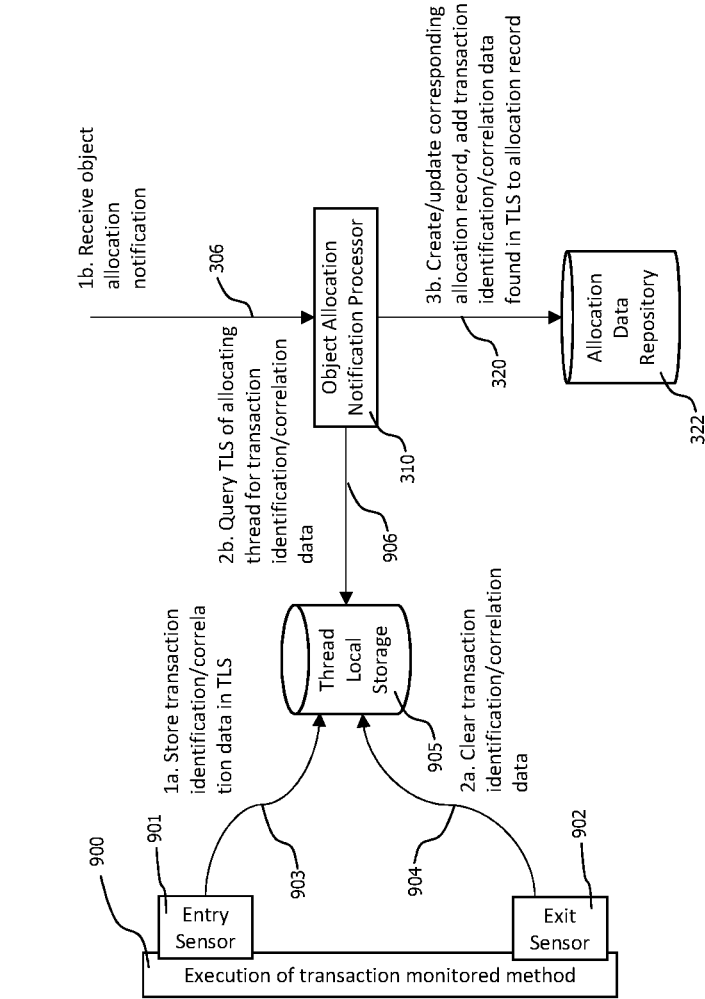

FIG 10: Transaction Context Integration – Transaction Triggered
FIG 10a: Sensor Architecture
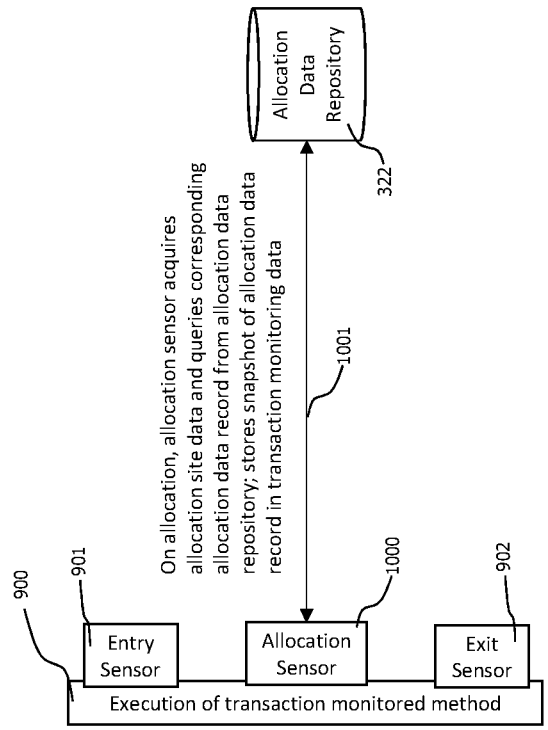
FIG 10b: Allocation Sensor Execution
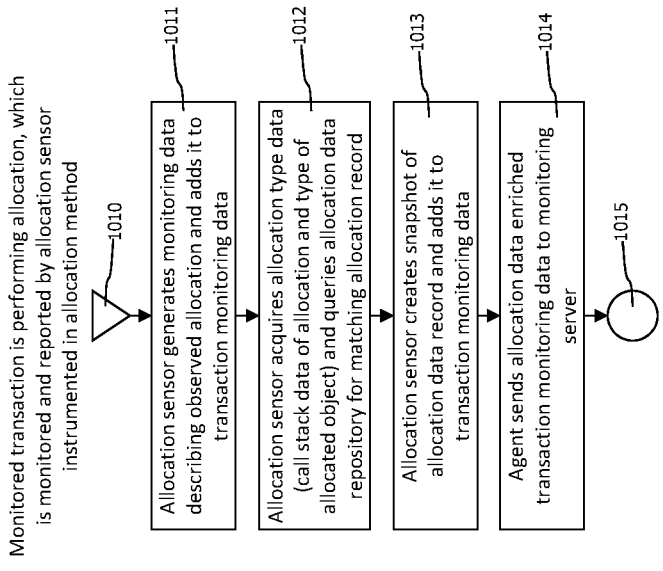

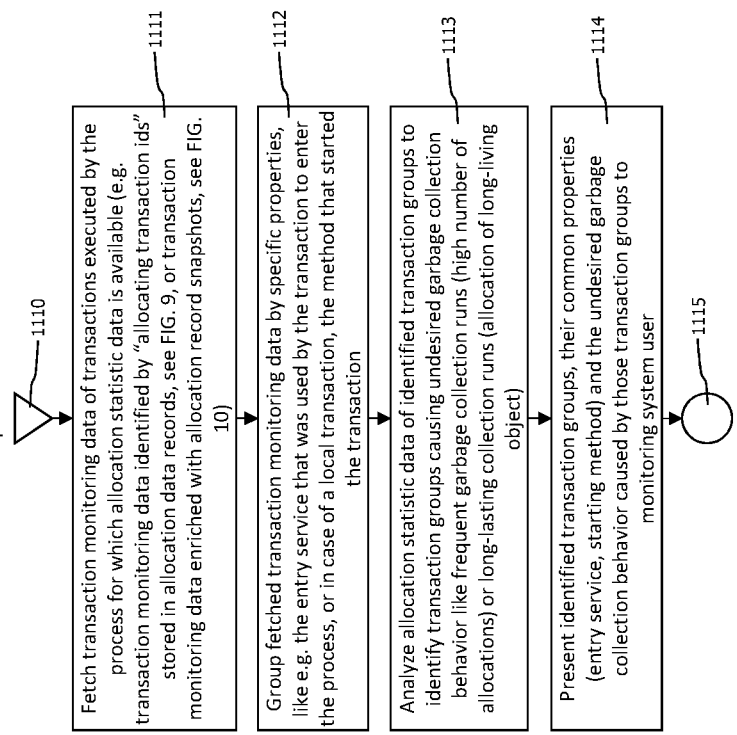
FIG 11: Transaction Context Aware Allocation Data Analysis
Analysis of transaction specific impact on garbage collection behavior on a specific process

METHOD AND SYSTEM FOR ESTIMATING GARBAGE COLLECTION SUSPENSION CONTRIBUTIONS OF INDIVIDUAL ALLOCATION SITES

CROSS-REFERENCE TO RELATED APPLICATION

This application claims the benefit of U.S. Provisional Application No. 63/090,921 filed on Oct. 13, 2020.

FIELD

The invention generally relates to the field of estimating correlations between garbage collection behavior and memory allocation patterns and more specific to the identification of memory allocation sites causing undesired garbage collection behaviors, like long lasting or frequent garbage collection runs.

BACKGROUND

Garbage collection has become a property of application runtime environment that is appreciated by software developers and managers of software projects. Programmers no longer need to take care when objects are no longer needed, because the garbage collection system monitors accessibility of objects and automatically reclaims them if they are no longer accessible. This provides additional safety for application programmers because it is no longer possible to inadvertently access objects that were already deallocated, or to forget to deallocate no longer needed objects. Programmers simply allocate the object they need and use them. They may clear references to no longer used objects, but they do not need to take care to deallocate those objects, as this is done automatically by the garbage collection system.

Unfortunately, this safety and convenience does not come for free. Garbage collection runs consume resources like CPU cycles and main memory. In addition, to determine whether allocated objects are still referred, some garbage collectors need a "stable heap" during execution, i.e., no new allocations are allowed during such garbage collection run. As a consequence, the whole application needs to be stopped during the garbage collection run. Such collection events are called "stop the world" pauses, as they completely halt all application functionality of the process in which the collection is performed. Therefore, it is desired to keep such "stop the world" pauses as short as possible.

Various optimizations have been developed to improve the performance of the garbage collection process, like generational garbage collection systems, which subdivide the heap memory into different pools that are dedicated for objects with different ages and that use different, optimized garbage collection strategies for those pools. Typically, objects are allocated in a small pool, which is managed using a garbage collection strategy that is fast, but has high memory requirements (e.g., a stop-and-copy strategy, which identifies living objects in a first pool and copies them to a second pool, clears the first pool and then swaps first and second pool for the next run). Objects that survive a certain number of those collections are copied to another, potentially larger, pool dedicated to hold long-living objects that is managed by a garbage collector using a strategy that is more CPU intensive but requires less memory resources (e.g., a mark-and-compact strategy, which first marks all live objects and then compacts the heap by moving all identified living objects into one contiguous memory region, thereby potentially overwriting no longer needed objects).

Other optimization approaches try to avoid allocations, which later cause costly/undesired garbage collection runs at all. An example of such optimizations is the escape analysis and scalar replacement concept. This approach tries in a first step to identify allocations that have no impact outside of the allocating function or method (i.e., the to be allocated object is not passed to a context outside of the method. A reference to the allocated object that is returned by the function or method or that is stored in a variable that is accessible from outside the object is an indicator that the object "escapes" the scope of the method and is accessible from outside its scope). Objects that do not escape the scope of the current function or method are not allocated on the heap but replaced by local variables that are allocated on the stack of the executing method. The following code then uses the stack variables instead of a heap object for further processing. Such optimizations are typically performed during runtime and perform, next to an escape analysis of allocated objects, also an analysis of the frequency of performed allocations, to focus this kind of optimizations on allocation commands that are executed with high frequency. Those optimizations only replace allocation commands with corresponding, equivalent data that does not use heap memory. Other portions of the executed code are not affected and the behavior of the executed code after the optimization is equivalent to the behavior of the not optimized code which still performs the heap allocation.

All those optimizations improve the overall performance of the garbage collection process, but they also influence its behavior and make it impossible to predict the impact that allocation patterns have on garbage collection behavior without run-time monitoring.

Vendors of runtime environments that use garbage collection services already provide monitoring interfaces that deliver data about the occurrence and duration of garbage collection runs, available memory before and after garbage collection runs and the like. But this data only describes the existence of garbage collection related problems, like too frequent or too long garbage collection runs, it provides no insight into the allocation patterns that cause those problems and the code segments that perform those undesired allocation patterns.

Instrumentation based approaches try to improve the visibility of performed allocation by instrumenting code that performs object allocations on the fly. The instrumented code then reports performed allocations to an analysis node which also receives monitoring data of occurred garbage collection runs. The analysis node then inspects both allocation data and garbage collection monitoring data to identify causal dependencies between both. However, such approaches have several shortcomings.

First, they cause considerable overhead, because to work properly, each allocation command must be instrumented with a sensor that reports performed allocations. In most modern runtime environments, the process of allocating memory is highly optimized and each additional activity that is performed, like e.g., the execution of an allocation sensor, represents high, often unacceptable overhead. It is not uncommon that the execution of an allocation sensor consumes more time/CPU resources than the allocation itself. Approaches to reduce the number of required allocation sensors are known in the art, but still the amount of overhead generated by the remaining allocation sensors causes an amount of overhead that most times is too high.

Second, instrumentation-based approaches do not combine well with allocation optimizations that identify and eliminate allocations that can be replaced with non-heap resources. Instrumentation typically analyzes source code or a type of intermediate code like Java® bytecode or the Common Intermediate Language (CIL) for the Microsoft .NET® environment, to identify portions of code, like code that performs an allocation, that should be monitored with a sensor. Typically, allocation eliminating optimizations like escape analysis and scalar replacement do not change bytecode or intermediate code. Conceptually, they only change the way how allocation commands are interpreted. Therefore, an instrumentation-based allocation monitoring system would not recognize if such optimizations were performed and may in such case incorrectly report allocations that did not occur. Even worse, allocation sensors may, for monitoring processes, pass allocated objects to monitoring related methods and functions. This additional passing of the allocated objects may be recognized by an escape analysis algorithm as an escape of the object and therefore prevent an otherwise possible allocation optimization. In these cases, the allocation monitoring system would have adverse effects on the allocation behavior of the monitored system that are much more severe than the overhead caused by placed sensors.

Consequently, there is demand in the filed for a monitoring system which correlates observed undesired garbage collection behavior, like too frequent or too long garbage collection runs, with allocation activities that likely cause tis behavior. Additional constraints for such a system include low, preferably adjustable, overhead, and correct reporting of allocations in combination with allocation avoiding optimizations.

This section provides background information related to the present disclosure which is not necessarily prior art.

SUMMARY

This section provides a general summary of the disclosure, and is not a comprehensive disclosure of its full scope or all of its features.

This disclosure describes allocation monitoring technologies that monitor, besides the occurrence of allocations and data describing observed allocations, like the type of the allocated object, its size and the code location that performed the allocation, also the lifetime of allocated objects, preferably in relation to the number of garbage collection runs that those objects survive.

The number of allocated bytes may be counted per allocation site and allocation type and may be used as indicator for allocation sites causing high-frequent garbage collections, as such allocations quickly fill available heap memory which causes more and frequent garbage collection runs.

Further, the number of survived garbage collection runs may be observed for monitored allocations, and the byte-size of those monitored allocations may be multiplied with the number of survived garbage collections to calculate the number of survived bytes. The survived bytes for an object are a good indicator for the amount of garbage collection activity that is caused by the object. Each object that is identified by a garbage collection run as "live" object needs to be copied to another location (i.e., to another pool for the stop and copy strategy, or to another position to compact the heap for the mark and compact strategy), whereas memory corresponding to no longer referred "dead" objects is simply cleared or overwritten. Therefore, the size of a surviving object and the number of times the object survives a collection run define the garbage collection activity caused by this object. Allocation sites that cause large numbers of survived bytes are typical candidates for causing long garbage collection runs.

Some embodiments of the disclosed technology may, to reduce overhead, use sampling technologies to select a statistically representative subset of all performed allocations and perform above-described allocation size and survived size monitoring and calculations only for this allocation subset.

Variants of those embodiments may observe the number of reported allocations to determine whether this number is in a desired target range, and in case the reported allocations are outside the target range, adapt the sampling density for reported allocations until the number of reported allocations again falls into the desired target range.

Still other embodiments of the disclosed technology may combine allocation monitoring data with transaction trace data to identify transactions or transaction categories that most probably cause frequent or long garbage collection runs.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 provides a conceptual overview of the monitoring data flow from a monitored application, over monitoring interfaces provided by the runtime environment of the monitored application to an analysis entity.

FIG. 2 shows a block diagram of an allocation monitoring system consisting of a monitored execution environment running an application, an agent and a monitoring server consuming and processing monitoring data.

FIG. 3 provides a block diagram of an agent that receives and processes allocation, deallocation, and garbage collection run notifications.

FIG. 4 shows data records that may be used to transfer allocation/deallocation and garbage collection notifications.

FIG. 5 depict flow charts describing the processing of notifications like allocation/deallocation notifications by a monitoring agent.

FIG. 6 shows flow charts of processes to control the sampling rate of reported allocations.

FIG. 7 shows the process of transferring allocation monitoring data from a monitoring agent to a monitoring server for analysis and visualization.

FIG. 8 provides flow charts of processes that perform exemplary analyses of allocation monitoring data to identify allocation sites probably causing frequent or long garbage collection runs.

FIG. 9 conceptually describes a variant sensor architecture and allocation data processing to integrate transaction trace data with corresponding allocation monitoring data that is driven by allocation notifications.

FIG. 10 conceptually describes a variant sensor architecture and allocation data processing to integrate transaction trace data with corresponding allocation monitoring data that is driven by allocations that are performed in the context of monitored transactions.

FIG. 11 provides a flow chart of a process that performs an analysis of allocation monitoring data and corresponding transaction monitoring data to identify transaction categories that probably cause high frequent or long-lasting garbage collection runs.

Corresponding reference numerals indicate corresponding parts throughout the several views of the drawings.

DETAILED DESCRIPTION

Example embodiments will now be described more fully with reference to the accompanying drawings.

The most obvious reason for frequent garbage collection runs is extensive allocation activity of an application, which rapidly fills available heap memory and requires a cleanup of no longer needed memory portions to make them available for subsequent allocations. Therefore, to get an insight about the reason for high garbage collection frequencies, it is important to identify allocation sites (i.e., code sequences that perform allocations) that are executed with high frequencies and therefore also cause high numbers of allocations.

A not so obvious reason for the efficiency of garbage collection runs is that the amount of time that allocated objects remain in a "live" state (i.e., are accessible from currently running code) increases the work that needs to be performed by garbage collection runs. Typically, to clear a specific memory area, garbage collectors first identify still alive objects in the memory area and then "evacuate" them, e.g. by copying them into another memory area. After this evacuation, the memory area can be used for new allocations. In a first extreme case, no object in the memory area is still alive, and after determining the live status of those objects, the garbage collector only needs to mark the memory area as again available for new allocation. In the other extreme, all objects in the memory area are still alive and the garbage collector needs to first copy all those objects to another area, which substantially increases the garbage collection effort and also the time required to finish the collection process.

The disclosed technologies use monitoring interfaces provided by runtime environments to get data about performed allocations, garbage collection runs and the deallocation of objects. At the current time, the Oracle Java® platform provides the best monitoring interface for this purpose. The disclosed concepts and technologies described herein are using those interfaces, but they may also be applied to other platforms providing similar or only a subset of those monitoring interfaces.

Coming now to FIG. 1, which conceptually describes the data flow and processing performed by a monitored application, a memory managements system, and a memory allocation data analysis system.

Typically, a monitored application 100 interacts with a memory management system 102 to request 101 heap memory space for new allocated objects. Programming languages typically provide programming statements like "new" statements, which indicate the request of heap memory. Those statements typically require a parameter specifying the type of the object for which heap memory is requested. The memory management system uses this type information to determine the amount of consecutive memory space that is required to store the object and then returns a reference to the start address of this memory space. In addition, the memory management system may analyze the usage of the to be allocated object, and if the usage pattern allows it, substitute the requested heap allocation with allocations on the stack of the currently executed method. In runtime systems providing memory management services, like automated garbage collection, the application 100 may use the allocated object until it is no longer required. The memory management system 102 may detect when the object is no longer used/referred and then automatically reclaim the memory area of the object to make it available for future allocations.

The memory management system 102 may provide monitoring interfaces, e.g., in form of notifications or callbacks that notify a monitoring entity, like an agent about the allocation of objects 103, the deallocation of objects 104, or the start and finish of a garbage collection run (not shown in FIG. 1). A monitoring agent (not shown in FIG. 1), may receive those notifications and aggregate 105 them to create allocation monitoring data 106, describing the amount of allocated memory, the frequency of allocation activities and data describing the lifetime of allocated objects. This allocation monitoring data may be grouped by allocation sites (i.e., code locations that perform allocations) and type (i.e., type or class of allocated object). The allocation monitoring data 106 may be forwarded to an allocation data analysis entity 107, that may reside on a remote monitoring server. The allocation analysis entity may perform various analyses of the received monitoring data, e.g., to identify allocation sites or types of allocated objects that are candidates for causing frequent or long-lasting garbage collection runs. Notifications 108 and 109, for identified allocation sites causing frequent allocations or allocations of long-living objects, which may in turn lead to frequent or long-lasting garbage collection runs, are sent to a user of the monitoring system 110.

Coming now to FIG. 2, which provides a block diagram of a monitoring system consisting of an agent 225, deployed to a runtime environment 200 in which a monitored application 201 is executed, and a monitoring server 227. Monitored application 201/runtime environment and monitoring server 227 may reside on different host computing systems and may communicate via a connecting computer network (not shown). Examples for runtime environments may include processes running an Oracle Java® virtual machine, or processes based on the Microsoft .NET® framework. Those runtime environments provide an abstraction form an underlying operating system and typically also provide their own, software implemented, memory management systems 206 that manages the memory that is assigned to the process.

The logic of the monitored application 201 may interact with a memory management system 206 of the execution environment 200 to request 202 heap memory allocations to store object or other data structures it needs for execution. An allocation optimization/avoidance unit 207 may first analyze 205 the usage context of the to be allocated objects to determine whether the requested allocations can be substituted by allocations on the local stack of the currently executed method or function. In case the requested allocation can be substituted, the substituted version of the allocation is returned 203 to the requesting application logic. Besides reserving data on the local stack to store data for simulated heap object, also the code that accesses this object may be changed to interact with stack variables instead of an object that was allocated on the heap.

In case the allocation simulation/avoidance module 207 detects that the requested allocation cannot be simulated with stack data, the allocation request is forwarded 208 to an allocation module 209, which interacts with the heap memory 211 of the execution environment 200, to reserve and allocate 210 the required amount of consecutive heap memory that is required by the to be allocated object. The heap memory 211 may be subdivided into different spaces or pools, like e.g., an initial space 213 for the creation of new objects, and a tenured space 212, for long-living objects. Objects 214 are typically allocated in the initial space 214. Only object that survive a specific number of garbage collection runs are moved to the tenured space 212.

A (generational) garbage collection module 216 may continuously observe the amount of available heap space, and in case it falls below a certain threshold, perform a garbage collection run 215 to identify no longer accessible objects, reclaim the heap memory that is occupied by those objects and make it available for new allocations. A generational garbage collection system subdivides the managed heap memory into several memory areas, spaces, or pools. New allocations are typically performed in an initial or "Eden" space, which is relatively small. A garbage collection strategy which is optimized for short-living objects is applied on objects in the pool. Objects that survive a certain number of garbage collection runs in the initial space are considered as long-living objects and moved to another memory space, e.g., tenured space 212, which is managed using a garbage collection strategy that is optimized for long-living objects.

Memory management systems as described above may also be referred to as garbage collecting memory management system.

An allocation monitoring interface 220 of the memory management system 206, provides monitoring data describing performed allocations and deallocations of objects, and the execution of garbage collection runs. Theoretically, the allocation monitoring interface 220 could provide notification data of all performed allocations, but in practice this would create too much overhead. Therefore, the allocation module 209 reports 219 only a fraction or sample of the performed allocations to the allocation monitoring interface. As long as the selection of reported allocations is not biased and statistically represents all performed allocations, this is sufficient for most applications or analyses.

An example for such a sampling-based allocation notification mechanism is the "SampledObjectAllocation" event service of the Java Virtual Tool Interface (JVMTI), which sends notification events for allocations that were performed by the Java Virtual Machine. Those events are only sent for actually performed heap allocations, allocations that were prevented and substituted by scalar replacement are, correctly, not notified. The events contain data identifying the allocating thread, the allocated object, the type of the allocated object and the size of the allocated object. The density of so reported allocations can be controlled by the JVMTI configuration method "SetHeapSamplingInterval", which takes an integer "sampling interval" parameter.

The "sampling interval" parameter roughly defines the interval of allocated bytes that lie between two consecutive notified allocations. As an example, if this sampling interval is set to 10 kilobytes, then after an object allocation was notified by an allocation monitoring event, at least 10 kilobytes of heap space need to be allocated before the next allocation is notified by an event.

The allocation monitoring interface may also provide a marking or tagging service 218 for already allocated objects. This service may be used to tag already allocated object with a marker. The garbage collection module 216 may, on deallocation of objects that contain such a marker, generate a deallocation notification 217, which may at least contain the data of the applied tag or marker.

An agent 225, which may be injected into the runtime environment 200 at startup, may interact with the allocation monitoring system to receive and store allocation data 221. The agent may on receipt of an allocation notification, also retrieve and store allocation detail and context data, like call stack of the thread performing the allocation or size and type of the allocated object. In addition, the agent may monitor the rate at which allocation notifications are received, and in case the allocation notification rate is outside a desired range (e.g., due to changed allocation behavior caused by load changes of the application), interact with the allocation monitoring interface 220 to adapt the allocation notification configuration in a way that allocation notifications are generated with the desired range.

Further, the agent 225 may for notified object allocations also generate tag data and request the allocation monitoring interface to tag or mark 222 the object for deallocation reporting. As a result, the agent receives a notification 223 when such objects are deallocated and may use the data contained in the notification to determine the corresponding allocation data to further calculate the lifetime of the just deallocated object.

In addition, the agent may receive notifications 224 for garbage collection runs and may on receipt of such notifications increment a counter for survived garbage collection runs for all registered live object (i.e., objects for which an allocation notification, but no deallocation notification was received).

The agent 225 may accumulate allocation monitoring data over specific time intervals (i.e., 5 seconds, 10 seconds or 1 minute) and send 226 the accumulated allocation monitoring data to a monitoring server 227 when the time interval is elapsed.

The monitoring server 227 may receive the accumulated allocation monitoring data and forward it to an allocation data analyzer 228, which performs various analyses of the received allocation monitoring data e.g., to identify allocation sites with allocation patterns that most probably cause frequent or long-lasting garbage collection runs.

Referring now to FIG. 3, which provides a block diagram of the components of an agent 225 that are related to processing and intermediate storage of allocation notification and monitoring data.

An allocation data repository 322 may be maintained by the agent to store aggregated allocation monitoring data in form of allocation records 323. An allocation record 323 may contain data identifying allocation site (i.e., code location which performs allocations, e.g., in form of call stack data) and allocation type (i.e., the type of the allocated object), and data describing the allocation activity of this allocation site and type.

An allocation record 323 may contain but is not limited to an allocation type identifier 324, which may be a hash value derived from allocation type data (i.e. allocation site and type of allocated object), allocation type data 324 consisting of data identifying the type of allocated objects 326 and allocation site data 327 and allocation quantity data 328, consisting of an allocation count 329 containing the observed allocation notifications for the allocation site and allocation type, an accumulated allocation size 330, containing the size number of bytes of notified allocations for this allocation site and allocation type, an accumulated survived garbage collection count 331, containing the number of garbage collection runs that allocations of this site and type survived, and an accumulated survived garbage collection size 332, accumulating the number of bytes from allocations of this site and type that had to be copied to another memory area during a garbage collection run.

The allocation records 323 are created and updated according to notified object allocations and deallocations. Recorded allocation quantity data may also be updated due to an emergency change of the allocation notification configuration to align monitoring data crated before the emergency change with monitoring data created afterwards.

Allocation records 323 may be cyclically fetched by an allocation data sender 335 to create and send corresponding allocation reports 338. The allocation data records 323 may be removed from the allocation data repository after sending of the allocation data report is finished.

A notification rate controller unit 307 may monitor incoming object allocation notifications 221 and track 305 the current rate of incoming allocation notifications and compare it to a target notification rate 308 and an emergency threshold rate 309. In case the current allocation rate is deviating from the target notification rate 308 or exceeding the emergency threshold rate, the notification rate controller may calculate a new allocation configuration value and send a request 301 to update the allocation monitoring configuration accordingly to the allocation monitoring interface. The notification rate controller unit may e.g., store a current allocation configuration monitoring value, like e.g., a minimum number of allocated bytes between two notified allocations. The target notification rate 308 may represent a desired allocation notification rate (e.g., 100, 500 or 1000 notifications per second) and the emergency threshold rate 309 may specify a notification rate at which immediate counter measures to reduce the notification rate are required to avoid an overload of the monitoring system or an adverse impact on the monitored application. The notification rate controller 307 may use the currently monitored allocation notification rate and the current allocation notification configuration to calculate a new allocation notification configuration, which is expected to generate allocation notifications at the desired target notification rate. As an example, the current allocation notification rate may be 200 allocations per second, the current allocation notification configuration may be 512 bytes (i.e., at least allocations of 512 bytes between two notified allocations). The desired target allocation rate may be 100 allocations per second. To shift the allocation rate to the target allocation rate, the notification rate controller 307 may send an allocation monitoring config request 301 to change the allocation configuration to 1024 bytes, which should reduce the performed allocation notifications by 50% to reach the target allocation notification rate. The allocation notification rate may continuously change, depending on the current application load and allocation frequency. The notification rate controller may cyclically update the allocation notification configuration to keep the observed allocation notification rate near the target notification rate.

Updates of the allocation notification configuration may in case the allocation notification rate is below the emergency threshold rate 309, be performed in sync with the sending cycle of the allocation monitoring data stored in the allocation data repository 322. This assures that all allocation monitoring data stored in the allocation data repository was recorded using the same allocation notification configuration, and no adaptation of the monitoring data to represent different notification/sampling configuration is required.

An immediate change of the sampling configuration is only required on an exceed of the emergency threshold rate 309. In this case, allocation monitoring data currently stored in the allocation data repository may be adapted 319 to values that would have been expected with the new allocation configuration. As an example, if an emergency update requires to immediately reduce the allocation notification rate by 50%, also the values (i.e., allocated bytes, survived GC count, survived GC size) of allocation monitoring data that is currently present in the allocation data repository will be reduced by 50% to compensate for the sampling configuration change. If the new sampling configuration would already have been in place when this monitoring data was generated, only 50% of the processed allocation samples would have been created, which would, on average, also have created only 50% of the corresponding accumulated allocation data values.

A detailed description of the processing performed by the notification rate controller can be found in FIGS. 6*a* and 6*b*.

In Java virtual machine environments, the JVMTI call "SetHeapSampling Interval", which requires an integer parameter that specifies an interval of heap allocated bytes between two notified allocations may be used to set the allocation notification rate.

A collection run notification processor 312 may receive notifications indicating performed garbage collection runs 224, and maintain data identifying and describing garbage collection epochs. A garbage collection epoch may be started with the end of a specific garbage collection run and end with the end of the succeeding garbage collection run. Garbage collection epochs subdivide the runtime of a virtual machine or execution environments into aligned, consecutive time periods. Therefore, each garbage collection epoch may be addressed and identified by an epoch number. The collection run notification processor may maintain collection epoch data 314, which may contain but is not limited to an epoch number 314, which identifies the currently active garbage collection epoch, and epoch period data, 315 which may describe the last garbage collection period by its start and end time. The collection run notification processor may e.g., increment the epoch number with each received collection run notification and update the epoch period data by e.g., setting the epoch start time to the currently stored epoch end time and the current notification time to the epoch end time.

As an example, JVMTI events of the type "GarbageCollectionStart" or "GarbageCollectionFinish" may be used to notify the start and end of garbage collection runs in Java virtual machine environments.

A detailed description of the processing performed by the collection run notification processor can be found in FIG. 5*c*

An object allocation notification processor 310, receives a forwarded object allocation notifications 306 according to the allocation notification configuration and creates or updates corresponding allocation records 323. An object allocation notification 221 may notify the allocation of an object of a specific type that was performed by a specific thread and may be forwarded 306 to the object allocation notification processor. The object allocation notification processor may use data identifying the allocating thread to gather data identifying the allocation site (i.e., by fetching call stack data for the allocating thread during the allocation). Gathered allocation type data may be used by the object allocation notification processor 310 to query 320 the allocation data repository for a matching allocation record. In case no matching record is found, a new one may be created, and its allocation type data may be set to the data describing the currently notified allocation (i.e., type of the allocated object set to type of allocated object 326 and allocation site data 327 to gathered call stack data). The created allocation record is then stored in the allocation data repository. Allocation site data 327 may not be available in some environments. In this case, only the type of the allocated object may be used to identify the type of a performed allocation. If allocation site data in form of call stack information is available, different embodiments may use the whole call stack information, only a subset of the call stack data, describing e.g., the method that performed the allocation and a specific number of parent method executions of the allocating method. Example call stack information may e.g., show that method A called method B, which in turn called method C which performed a notified allocation. Some embodiments may use A, B and C as allocation site data, some only B and C and some may only use C as allocation site data.

The allocation count 329 of the fetched or created allocation record is incremented by one and the accumulated allocation size is incremented by the size of the allocated object.

In Java virtual machine environments, the JVMTI event "SampledObjectAlloc" may be used to notify a sampled allocation. The event may contain data identifying the allocating thread, a reference to the allocated object, a reference to the type of the allocated object and the size of the performed allocation in bytes.

The object allocation notification processor 310 may also, on receipt of an allocation notification, register 222 the object which was allocated by the notified allocation for deallocation notification. The goal of this deallocation notification is, to get data about the deallocation of the notified object, to e.g., calculate the lifetime of the object and the number of survived garbage collection runs for the object. The object allocation notification processor may retrieve 311 the current garbage collection epoch number 314 from the collection run notification processor 312 to generate data describing the allocation of the object which may be used for the registration for deallocation notification.

In Java virtual machine environments, the JVMTI call "SetTag", which requires a reference to the object that should be tagged, and a tag value as parameters, may be used to register objects for deallocation notification. The Java virtual machine may, on deallocation of such tagged objects, send a JVMTI event of type "ObjectFree", containing the tag value. The object allocation notification processor may first create a tag value which contains data to identify the allocation record corresponding to the observer allocation, e.g., in form of the allocation type identifier, data identifying the garbage collection epoch 314 that was active during the allocation, and data describing the size of the performed allocation. The so created tag value may then be used for the "SetTag" call. The agent may, in variant embodiments, create a unique tag value, which is used both for the "SetTag" call and also as a key in a separate repository that maps those keys to corresponding allocation type identifier, allocation epoch and size data.

An object collection notification processor 317 may receive deallocation notifications 223 for objects that were registered for deallocation notification by the object allocation notification processor 310. Data received with the deallocation notification 223 may be used to determine allocation type identifier, allocation garbage collection epoch and the size of the deallocated object. The object collection notification processor may, on receipt of a collection notification, retrieve 316 the currently active garbage collection number, which identifies the garbage collection epoch at which the object was collected. The retrieved data may be used to calculate the number of garbage collection runs the object survived (collection epoch number minus allocation epoch number) and the number of bytes that garbage collectors needed to copy for the collected object (number of survived garbage collection runs multiplied by the size of the object). Further, the determined allocation type identifier may be used to fetch 321 a matching allocation record 323 for the deallocated object. Accumulated survived garbage collection count 331 and accumulated survived garbage collection size 332 of the fetched allocation record may be incremented by corresponding previously calculated survived garbage collection count and garbage collection size.

In Java virtual machine environments, a JVMTI event of the type "ObjectFree", which contains the tag value that was used to register the currently deallocated object for deallocation notification as parameter, may be used to notify the deallocation of an object.

An allocation data sender 335 may cyclically fetch 333 allocation data records 323 contained in the allocation data repository 322, to create allocation reports 338, which may then be sent 337 to a monitoring server 227 for analysis.

An allocation report 338 may contain but is not limited to an observations section 339, containing fetched allocation records 323, and an observation conditions section 341, which contains data describing the conditions that applied during the reported allocation observations. An observation conditions section 341 may contain but is not limited to a notification configuration 342, which describes sampling conditions for notified and reported allocations (i.e. minimum number of bytes allocated on heap between two notified allocations), data describing the observation period 343, e.g. in form of a start and an end time, the total number of bytes that were allocated during the observation period 344, and memory configuration data 345, like the size of memory pools, or the conditions for the transition of object between memory pools.

The allocation data sender may fetch 318 required allocation notification data from the notification rate controller. Total allocation amount and collection configuration data may be fetched 334 from corresponding interfaces of the execution environment.

Further, the allocation data sender may maintain a garbage collection number that was active during the last report generation 336. This epoch number may, on sending and clearing allocation records 323 be set to the currently active garbage collection epoch number 314, and it may be used to identify and discard outdated object collection notifications. Outdated object collection notifications may occur when objects are allocated before an allocation report was created and are deallocated afterwards. In this case, no more corresponding allocation record is available when the deallocation notification is received. The epoch number of previous report 336 may be used to identify such deallocation notifications, by comparing the allocation epoch number for such deallocation notifications with the last report epoch number 336. If the allocation epoch for the notified deallocation is smaller than the last report epoch number, the deallocation notification may be discarded.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

A detailed description of the processing performed by the allocation data sender can be found in FIG. 7.

Various data records that may be used to notify allocation events, to register objects for deallocation notification and to change the notification rate for allocations are displayed in FIG. 4.

An object allocation notification record 400, as shown in FIG. 4a, may be used to notify the allocation of an object in heap memory and may contain but is not limited to a reference to the allocated object 401, a reference to the type of the allocated object 402, the number of allocated bytes 403 and allocation context data 404, like a reference to the execution thread that performed the allocation, and call stack data describing the code location of the performed allocation.

Object allocations which were selected for notification may be registered for a deallocation notification. Notifications that report their deallocation may be sent for objects that are so registered. Object deallocation notification request records 410, as shown in FIG. 4b, may be used for such notification registrations. An object deallocation notification request record 410 may contain but is not limited to an object reference 411 and notification identification data 412. The object reference 411 may be used by the memory management system to identify the object for which deallocation notification is requested, and notification identification data 412 may be used to define additional data that is required for notified deallocations. Typically, the notification identification data 412 that was provided during the deallocation notification registration request is also included in the deallocation notification that is later sent on the deallocation of the object. Quality and amount of notification identification data depends on the data that deallocation notifications already contain out of the box. The required deallocation data include allocation type identification data 414, allocation garbage collection epoch number 413 and allocation size 415, which are required to identify the corresponding allocation record 323 for the deallocated object and to calculate the number of survived garbage collections and the number of survived bytes. Some allocation monitoring systems may e.g., provide the size of a deallocated object already in their original deallocation notifications. In this case, the notification identification data may not contain an allocation size.

As already mentioned, in Java virtual machine environments, the JVMTI call "SetTag", which requires an object reference and a tag value (an integer value with a bit-length of 64). Some variant embodiments may encode allocation epoch number, allocation type identifier and allocation size in the tag value. Other variants may use unique identifies for tag values and use the tag values also as keys in an additional repository that maps key values to corresponding allocation epoch number, allocation type identifier and allocation size values.

Object deallocation notifications records 420, as displayed in FIG. 4c may be used by the allocation monitoring interface 220 to notify the deallocation of objects that were registered for deallocation notification. Deallocation notifications records 420 may contain but are not limited to notification identification data 421, which may contain the data that was used as notification identification data 412 during the registration of the object for deallocation notification. Notification identification data 421 may be used to identify and correlate allocation and deallocation data for an object.

Collection run notification records 430, as shown in FIG. 4d, may be used by the allocation monitoring interface 220 to notify garbage collection runs. A collection run notification record 430 may contain but is not limited to a collection type identifier 431, which may be used to describe the type of performed garbage collection (i.e., "stop and copy" or "mark and sweep"), and collection duration data 432, describing the duration of a garbage collection.

In Java virtual machine environments, JVMTI events "GarbageCollectionStart" and "GarbageCollectionFinish" may be used to notify the start and end of a garbage collection run.

FIG. 4e describes an allocation configuration change request record 440, which may be used to set the notification rate of performed heap allocations. An allocation configuration change request record 440 may contain but is not limited to a notification density parameter 441. The notification density parameter may e.g., define a minimum number of allocated heap memory allocations or a minimum number of performed heap allocations between two notified allocations. Before this parameter is applied by the allocation monitoring interface to identify the next allocation that should be notified, it may be altered with a randomized offset to reduce sampling bias.

The JVMTI configuration function "SetHeapSamplingInterval" is provided in Java virtual machine environments to configure allocation sampling. The function requires an integer "sampling_interval" parameter, which specifies the minimum number of bytes that need to be allocated on the heap between two notified allocations. The higher the value of this parameter is, the less allocations will be notified, because more not notified allocation activity is performed between two notified allocations.

The heap sampling interval is applied on thread level. The virtual machine may for each individual executing thread monitor the number allocated heap bytes. If an allocation was notified for a specific thread, and the amount of heap allocations by this thread exceeds the value of the sampling interval parameter, the next allocation of this thread can be selected for notification.

Coming now to FIG. 5, which describes processes performed by modules of the agent to process received allocation notifications.

The processing of allocation notifications, e.g., in form of received allocation notification records 400 is shown in FIG. 5a.

The process starts with step 500, when the agent 225 receives an allocation notification. Following step 501 forwards the allocation notification to the notification rate controller 307, which uses the received notification to update its estimation data for the current allocation notification rate (i.e., estimated number of allocation notification per interval or observation period). Step 502 forwards the allocation notification also to the allocation notification processor 310. The allocation notification processor may in step 503 fetch allocation site data that is not already contained in the allocation notification, like call stack data for the allocating thread during the performed allocation. The obtained call stack may be used to identify the location of the performed allocation in the executed code.

Afterwards, the object allocation notification processor may in step 504 create a value for an allocation type identifier, e.g., by calculating a hash value from received and gathered allocation type data (i.e., allocation site data in form of fetched call stack data and data describing the type of the allocated object). Step 504 may then continue by querying the allocation data repository 322 for an allocation record 323 with an allocation type identifier 324 that matches the allocation type identifier created by this step.

Following decision step 505 executes step 506 in case no matching allocation record was found. Otherwise, it continues with step 507. Step 506 creates a new allocation record using the received and calculated allocation type data (type of allocated object 326 and allocation site data 327, e.g., in form of call stack data) and allocation type identifier 324. Step 506 may also set the allocation quantity data 328 of the created allocation record to indicate no corresponding allocation (i.e., setting allocation count 329, accumulated allocation size 330, accumulated survived garbage collection count 331 and accumulated survived garbage collection size 332 to 0) and then insert the created allocation record into the allocation data repository.

Step 507 may afterwards update the allocation quantity data of the fetched or created allocation record to also represent the new notified allocation. Step 507 may increment the allocation count 329 by 1 and increment the accumulated allocation size 330 by the size of the new allocated object (the size of the allocated object may be received with the allocation notification).

Following step 508 may then register the object for which the allocation notification was received for a notification of its later deallocation. The deallocation registration may be performed in a way that all data required to determine the lifetime of the object, its size and data to identify the allocation record that describes allocation site and object type of the object are available when the deallocation notification is received.

The required data may be encoded into the deallocation notification request in a way that it is later returned with the corresponding deallocation notification. As described above, the JVMTI call "SetTag" may be used for this purpose in Java virtual machine environments and the required data may be encoded in the provided tag value, which is returned with the notification of the deallocation of the so registered object.

The process then ends with step 509.

Coming now to FIG. 5b, which describes the processing of a deallocation notification by the object collection notification processor 317.

The process starts with step 510, when the agent 225 receives a deallocation notification, e.g., in form of a deallocation notification record 420. The received notification is forwarded to the object collection notification processor 317 in subsequent step 511.

Following step 512 may determine whether the allocation of the now deallocated object was performed before the current allocation monitoring period and can thus be ignored. Step 512 may first fetch the epoch number of previous report 336 from the allocation data sender 335, which identifies the garbage collection epoch that was active during the last sending of allocation monitoring data. Further, step 512 may analyze the received deallocation notification to extract the garbage collection epoch that was active during the allocation of the now deallocated object. Step 508 of the allocation notification processing may have performed the registration for deallocation notification in a way that the corresponding allocation epoch number is available during the processing of the deallocation notification.

Following decision step 513 then compares the extracted allocation epoch number with the fetched last send epoch number 336. In case the allocation epoch number is smaller than the last send epoch number, the allocation was performed before the last send of allocation monitoring data. In this case, the deallocation notification is discarded, and the process ends with step 519.

Otherwise, the process continues with step 514, which extracts the value of the allocation type identifier from the received deallocation notification (this value was preserved by step 504 during processing of the allocation notification of the now deallocated object). Step 514 then uses the extracted allocation type identifier to fetch the allocation record with a matching allocation type identifier 324 from the allocation data repository. The allocation type data section 325 of the fetched allocation record 323 identifies the type 326 of the now deallocated object, and the allocation site 327 on which it was allocated.

As already mentioned in step 503 of FIG. 5a, call stack data may not be available on all platforms. In such situations, allocation type data 320 may only contain the type of the allocated object, and corresponding allocation quantity statistics may describe allocation quantity data for all objects of that type, regardless of the code locations of performed allocations. Deallocation notifications may in such environments only contain object type data to identify corresponding allocation records 323. All subsequent analyses of allocation statistics, to identify the allocation activity causing undesired garbage collection behavior may provide results on object type level only. As an example, without allocation site data, such analyses may e.g., reveal that allocations of objects of type A may be responsible for long garbage collection runs, but it would not be possible to identify specific code locations (allocation sites) that cause this allocation activity. An additional manual analysis in combination with the code of the allocation would be required to identify those code locations.

Following step 515 may then fetch the number of the currently active garbage collection epoch 314 from the collection run notification processor 312 and then calculate the number of garbage collection runs that the now collected object survived. Step 512 may subtract the value of the garbage collection epoch that was active during the allocation of the now deallocated object from the value of the currently active garbage collection epoch to calculate the survived garbage collection runs. Subsequent step 516 may then increment the accumulated survived garbage collection count 331 of the allocation record 323 fetched in step 514 by the calculated number of survived garbage collection runs.

Following step 517 may then retrieve the size of the now deallocated object (step 504 of the allocation notification process may have persevered size information for the now deallocated object) and subsequent step 518 may calculate the survived garbage collection size of the deallocated object by multiplying its size (in bytes) with the number of survived garbage collection runs (which was calculated in step 515). Step 517 may then increment the accumulated survived garbage collection size 332 of the previously fetched allocation record 323 by the calculated survived garbage collection size.

The process then ends with step 518.

FIG. 5c provides a flowchart that describes the processing of garbage collection run notifications by the agent. The process starts with step 520, when the agent received a notification for a garbage collection run. Following step 521 forwards the received notification to the collection run notification processor 312. In subsequent step 522 the collection run notification processor may analyze the received garbage collection notification and in case it indicates the end of a garbage collection run, increment the current garbage collection epoch number 314. Step 522 may also use data of received garbage collection notifications to update epoch period data, like the start and end time of the last performed garbage collection run.

The process then ends with step 523.

FIG. 6 describes the processing performed by the notification rate controller 307 to keep the number of notified allocations per time period in a desired range, even if the allocation behavior of the monitored application changes over time, e.g., due to fluctuating load situation.

FIG. 6a describes the cyclic adjustment of the allocation notification configuration to keep the rate of allocation notifications in a desired range.

The process starts with step 600, when an examination of the current allocation notification rate indicates that the observed allocation notification rate is outside of a desired range. The process may e.g., be started after the sending of currently available allocation monitoring data by the allocation data sender 335 is finished.

Subsequent step 601 calculates an estimate for the current allocation notification rate. Step 601 may e.g., divide the number of notified allocations since the last execution of the process by the time that was elapsed since the last execution. The result of step 601 may be an allocation notification rate which is specified as a number of allocation notifications per time interval, like e.g., 100 notifications per second or 500 notifications per second.

Following decision step 602 may then compare the estimated current allocation notification rate with a desired or target allocation rate. The target allocation rate may be defined according to a tolerable monitoring overhead caused by allocation monitoring activities and a desired accuracy of allocation monitoring data. It a may be set during configuration of the agent. Step 602 may determine whether the difference between the target allocation range and the current allocation range is below a certain threshold (e.g., below +/−5% of the target allocation notification range). In case this difference is smaller than the threshold, step 602 may end the process with step 606 without changing the allocation notification configuration.

Otherwise, step 603 is executed, which analyses the currently active allocation notification configuration parameter in conjunction with the currently observed allocation notification rate, to calculate a new allocation notification configuration parameter that produces the desired target rate of allocation notifications. In case the allocation notification configuration parameter specifies a minimal distance (e.g. in amount of allocated memory, number of performed allocations or amount of elapsed time) between two notified allocations and is therefore inversely proportional to the created notification rate, step 603 may e.g. determine a ratio between currently observed notification rate and target notification rate (i.e., by dividing the current notification rate by the target notification rate) and then multiply the current notification configuration parameter with this rate to get the new notification configuration parameter.

As an example, the current allocation notification rate may be 100 notifications per second, the target notification rate may be 50 notifications per second and the current notification configuration parameter may be 100 kilo bytes (after a notified allocation, no other allocation is notified until at least 100 kilo bytes of heap memory were requested by not notified allocation before the next allocation is notified. In this case, step 603 may divide the current notification rate (100) by the desired notification rate (50) to get a ratio between current and desired rate (2) and then multiply the value for the current notification configuration parameter (100 kilo byte) with this ratio to calculate the new value for the notification configuration parameter (200 kilo byte)

In case the allocation notification configuration parameter is proportional to the allocation notification rate, the new parameter value may e.g., be determined by dividing it by the previously calculated ratio between current and target notification rate. As an example, the notification rate may be proportional to the allocation rate (i.e., the rate in bytes per second, at which the monitored system allocates heap memory) and may be defined in form of a notification percentage, i.e., 5%, 1% or 0.5% of all allocations are notified. In this case, an increase of an allocation rate may be compensated by a decrease of the value of the notification configuration parameter. In this case, a double allocation rate may be compensated by dividing the value for the notification configuration parameter by two to reach the same notification rate as before the increase of the allocation rate.

Following step 604 may then send a request 301 to update the allocation notification configuration with the new configuration parameter value calculated by step 603 to the allocation monitoring interface 220.

As mentioned before, the JVMTI call "SetHeapSamplingInterval", which takes a "sampling_interval" parameter that specifies the minimum number of bytes that need to be allocated on the heap between two consecutive allocation notification, may be used on Java virtual machine environments to update the allocation notification configuration.

Subsequent step 605 may forward the new applied allocation notification configuration parameter to the allocation data sender, which may use this data for the next sending of allocation monitoring data. The process then ends with step 606.

Coming now to FIG. 6b, which describes the handling of observed emergency situations by the notification rate controller, which may arise due to a rapidly increasing allocation notification rate, which requires immediate counter measures.

The process starts with step 610, when such an emergency situation is detected. Various indicators may be used to detect such emergency situations, one example method would be to count the number of allocation notifications in the current observation period (i.e., since the last sending of allocation monitoring data), compare this count to an emergency threshold, and consider an exceed of this threshold as indicator of an emergency situation.

Following step 611 may then, based on currently observed notification rate and currently active allocation notification configuration parameter, calculate a new allocation notification configuration parameter which should generate an allocation notification rate that is near the target notification rate. Step 611 may perform calculations and other activities as already described in step 603 of the conventional allocation adjustment process. Following step 612 may then apply the new allocation notification configuration parameter at the allocation monitoring interface (as already described in step 604 of FIG. 6a).

Afterwards, step 613 is executed, which calculates an adjustment factor for allocation monitoring data that is currently stored in the allocation data repository that was recorded with the allocation notification configuration that was active before the emergency update. The calculated adjustment factor should translate allocation monitoring data (i.e., allocation quantity data 328 of allocation record) that is based on allocation notifications according to the notification configuration before the emergency update into corresponding allocation monitoring data that would (most probably) have been generated using the new notification configuration that was applied to mitigate the emergency situation. Step 613 may e.g., determine a proportion factor between old and new allocation configuration, e.g., by dividing the new value by old value if the configuration parameter is proportional to the allocation notification rate or dividing the old value by the new value if the configuration parameter is inversely proportional to the allocation notification rate.

Following step 614 may then apply the adjustment factor calculated by step 613 to all allocation monitoring data that is currently store in the allocation data repository. Step 614 may e.g., multiply allocation count 329, accumulated allocation size 330, accumulated survived garbage collection count 331 and accumulated survived garbage collection size 332 with the adjustment factor calculated by step 613.

The goal of steps 613 and 614 is to adjust allocation monitoring data that was already created before the emergency change to make it statistically equivalent and comparable with allocation monitoring data that will be recorded after the emergency change. After the adjustments performed by step 613 and 614, allocation monitoring data recorded with the new settings can be accumulated to already existing allocation monitoring data.

The process then ends with step 615.

The transfer of allocation monitoring data from the agent 225 to the monitoring server 227 is shown in FIG. 7.

The process is performed cyclically with a specific frequency (i.e., every 5, 10 or 30 seconds, every 1, 5 or 10 minutes) and starts with step 700, e.g., when the cycle time since its last execution has elapsed.

Following step 701 may then fetch allocation records 323 which currently exist in the allocation data repository 322. Afterwards, step 702 may determine the total amount of heap memory that was allocated during the observation period represented by the to be sent allocation monitoring data. Allocation monitoring interfaces may provide corresponding data, e.g., in form of an accumulated allocation counter that represents the number total number of heap allocated bytes since the start of the execution environment. The allocation data sender may fetch this counter on each sending of allocation monitoring data and subtract the count value acquired for the last sending from the count value acquired for the current sending.

Following step 703 may then use allocation notification configuration that defines the sample of notified allocations to extrapolate allocation monitoring data to statistically represent all performed allocations. It may be assumed that allocations of a specific type of object performed by a specific allocation site may be uniformly distributed over the observation period. Consequently, the number of samples that show the specific object type and allocation type in relation to the overall number of samples for the observation period may be proportional to the total number of allocations of the specific type by the specific site during the observation period. To calculate an extrapolation factor for an estimated total number of allocations of the specific type by the specific site, the fraction of samples in which the specific type and site were seen (number of samples of specific type and site divided by total number of samples) may be calculated. Then, the memory size represented by a notification may be divided by the size of the specific object type to calculate a weight for the object type. The extrapolation factor may be calculated by multiplying the weight of the object type by the sample fraction for the specific object type and allocation site. As an example, step 703 may for an allocation notification configuration that specifies the number of bytes between two notifications, a specific allocation site, and the size of an object of a specific type, calculate an extrapolation factor by dividing the sample interval size (i.e., the number of bytes between two allocation notifications) by the size of the allocated object and then multiply the result of the division by the fraction of samples for the observation period that describe allocations of objects of the specific type by the specific allocation site. The so calculated factor represents the number of allocated, but not notified object of this type. Step 703 may then multiply correspond allocation quantity data (i.e., allocation count 329, accumulated allocation size 330, accumulated survived garbage collection count 331 and accumulated survived garbage collection size 332) with this factor.

The total allocation amount data fetched by step 702 may be used to normalize the extrapolated monitoring data. As an example, allocation count 329 or accumulated survived garbage collection count 332 may be divided by the total amount of allocated memory to put this monitoring data in relation to the overall allocated memory. So created relative monitoring data for different observation periods is comparable, even if the allocation intensity varies between those periods. Analysis processes that use allocation monitoring data from different observation periods, like the processes described in FIG. 8, may perform such a data normalization in a preparation step.

Afterwards, step 704 may fetch various configuration data of the memory management system 206, like data describing the size of various memory pools 212, 213, pool transition conditions (i.e., number of required garbage collection runs of an object to move it form initial to tenures space), and subsequent step 705 may then create an allocation record 338 and initiate it using the previously fetched data.

The created allocation record 338 is then sent to the monitoring server in step 706 and following step 707 clears the allocation data repository 322. Variant embodiments may already clear the allocation data repository in step 701, after the allocation records were fetched.

The process then ends with step 708.

As sending of allocation monitoring data is independent and asynchronous to allocation activities, some object may live during sending of allocation data. For such objects, allocation is notified before allocation data sending and deallocation afterwards. As already mentioned before in FIG. 5*b*, outdated deallocation notifications are discarded. However, completely ignoring the deallocation of such objects would tamper the created monitoring data. To mitigate this adverse effect, the deallocation of such objects may be "simulated" during the sending process.

To enable such deallocation simulation, the agent may maintain a separate repository (not shown in drawings) which contains data describing all object for which the allocation was notified and that are still alive. Such a repository may e.g., be maintained by allocation notification processing (FIG. 5*a*, additionally adding data describing allocation type and allocation time to the repository) and deallocation notification processing (FIG. 5*b*, removing data for deallocated object from repository). On monitoring data sending, the allocation data sender may query this repository for data of still living objects that were allocated before the last sending of monitoring data (i.e., that have an allocation epoch number that is smaller than the epoch number of the last monitoring data sending). The so queried data may be used to update allocation quantity data to describe a deallocation of those objects at the time of allocation data sending. For each queried data record of a living but outdated object, accumulated survived garbage collection count 331 and accumulated survived garbage collection size may be updated with data assuming that the object was just deallocated.

Coming now to FIG. 8, which describes exemplary analysis processes that are based on the generated allocation monitoring data to identify allocation sites that show allocation and object usage patterns that most probably cause too frequent or too long garbage collection runs of a specific process.

FIG. 8a provides the flowchart of a process that analyzes allocation monitoring data of a specific process to identify allocation sites that are most probably causing frequent garbage collection runs.

The process starts with step 800, e.g., when a user of the monitoring system requests such an analysis for a specific process. Alternatively, garbage collection metrics, that report the frequency of garbage collections performed by a monitored application may be monitored, and the monitoring system may compare the frequency of observed garbage collections with a threshold. A request to perform an analysis run to identify allocation sites that cause this high-frequent collection runs may automatically be triggered by the monitoring system when this threshold is exceeded. The received request may also contain a time period specifying the observation time that should be considered for the analysis. For analysis requests that were triggered by a garbage collection monitoring metric that exceeded a threshold, the time period that should be considered for the analysis may be derived from the time period during which the garbage collection monitoring metric exceeded the threshold.

Following step 801 may then fetch the allocation reports 338 for the specific process and for the time period specified in the request and following step 802 may then merge allocation records 323 contained in the fetched allocation reports 338 that have identical allocation type data 325.

Step 802 may e.g., group allocation records 323 by identical allocation type data (i.e., same type of allocated object 326 and same allocation site data 327) and accumulate the allocation quantity data 328 of each group into one merged allocation record. A merged allocation record represents the allocation quantity data 328 for an allocation type 325 for the whole analysis period. The merging performed by step 802 may, in some embodiments, consider complete call stack data of allocation site data to identify identical allocation type data, while other embodiments may only consider the portion of the call stack data for the method execution that performed the allocation and ignore nested method executions that led to the execution of the allocating method. Still other variant embodiments may only consider a subset of the call stack data, describing a specific number of parent method executions that led to the execution of the allocating method.

Following step 803 then sorts the merged allocation records descending by their accumulated allocation size 330, and subsequent step 805 selects the top n (e.g., 5, 10 or 30 records with highest allocation size, top 1, 5 or 10% etc.) allocation records with highest accumulated allocation size and presents the allocation type data of those allocation records as identifiers for allocation sites that most probably cause high-frequent garbage collection runs to a user of the monitoring system. The process then ends with step 805.

FIG. 8b describes the analysis of allocation monitoring data to identify allocation sites that cause long-lasting garbage collection runs on a specific process.

Similar to the analysis to identify allocation sites causing frequent garbage collection runs, also this analysis may be triggered by a user request or as a result of a garbage collection metric that e.g., measures the average duration of garbage collection runs exceeding a threshold. In both variants, the process starts with step 810 and then continues with step 811, which fetches allocation reports 338 for the specific process that were recorded during the time period that should be analyzed.

Following step 812 then merges the allocation records of the fetched allocation records by their allocation type data as already described in step 802 of FIG. 8a. Afterwards, step 813 sorts the merged allocation records descending by their accumulated survived garbage collection size 332, and step 814 may present the allocation type data of the top n allocation records 323 with highest accumulated survived garbage collection size as the allocation sites that most probably cause long-lasting garbage collection runs. The process then ends with step 815.

The analysis processes described in FIG. 8 may, in some embodiments also be performed on allocation monitoring data from multiple processes. Perquisites for such an analysis using data from multiple processes include that used allocation monitoring data is received from processes that execute the same code and receive load of comparable amount and quality.

In some embodiments, the analysis processes described in FIGS. 8a and 8b may be triggered by the receipt of a new allocation report 338 from an agent, and the triggered analysis runs may only consider the allocation records 323 contained the received allocation record. Steps 802, 803, 812 and 813 may be omitted in such embodiments, because only allocation records with distinct allocation type data 325 exist in the allocation report and merging steps are not required.

FIGS. 9 to 11 discuss the correlation of allocation monitoring data with transaction trace and monitoring data to identify groups of transaction executions that are potential causes for too frequent or long-lasting garbage collection runs.

FIG. 9 describes a correlation approach which uses already existing transaction correlation data to match corresponding monitoring data describing method entries and method exits to combine transaction tracing data with allocation monitoring data.

FIG. 9a provides and architectural overview of placed sensors, the storage of transaction related correlation data and the access of this correlation data by allocation monitoring components.

A transaction monitored method 900 may be instrumented with an entry sensor 901 and at least one exit sensor 902, where the entry sensor is executed when the execution of the monitored method starts, and the exit sensor is executed when the execution of the monitored method ends. The entry sensor 901 may store 903 transaction identification and correlation data in a thread local storage (TLS) 905 of the thread executing the method. A TLS represents a global storage area that is accessible for all code executed by the thread. Debugging interfaces, like the JVMTI in case of Java virtual machines, may also provide access to thread local storage form outside the thread that owns the TLS.

After the execution of the method 900 is finished, the exit sensor 902 may read, use, and remove 904 the transaction identification and correlation data that is stored in the TLS.

In parallel and asynchronously to the execution of the monitored method 900, the allocation monitoring system as described above may receive 306 an allocation notification. In addition to the already mentioned activities corresponding to a notified allocation, the object allocation notification processor may query the TLS of the thread that performed the notified allocation for existing transaction identification/correlation data. In case such transaction identification/correlation data is found, the object allocation notification processor may store this data in the allocation record corresponding to the notified allocation.

The flow chart shown in FIG. 9b describes the additional activity that is performed by the object allocation notification processor on a notified allocation. The process starts with step 910, when an allocation notification is received. Subsequent step 911 queries the TLS of the thread that performed the allocation for transaction identification/correlation data. If no such data exists in the TLS, decision step 912 terminates the process with step 914. Otherwise, step 913 is executed which stores the fetched transaction identification/correlation data in the allocation record of the notified allocation. As an example, allocation records may be extended with an additional "transaction identifiers list", and step 913 may add the transaction identification/correlation data to this list. The process then ends with step 914.

Another variant to combine allocation monitoring and transaction trace data is shown in FIG. 10. In contrast to the approach described in FIG. 9, which is driven by allocation notifications received by the allocation monitoring system, this approach uses separate allocation sensors 1000, which recognize allocations performed by transactions and in this case accesses the allocation data repository 322 to fetch allocation record data corresponding to the observed allocation and enriches transaction trace data with the fetched allocation monitoring data.

FIG. 10a shows an exemplary sensor placement setup for this approach. Again, entry 901 and exit sensors 902 are placed in a monitored method. In addition, an allocation sensor 1000 may be placed to monitor allocations performed during transaction executions. The allocation sensor may be configured to only report allocations that were performed during the execution of a monitored transaction to reduce overhead. The allocation sensor may use data stored in the TLS of the executing thread to determine whether an execution of a monitored transaction is currently ongoing.

On observation of an allocation by a monitored transaction, the allocation sensor 1000 may generate allocation type data 325 for the observed allocation. This allocation type data may be used to query 1001 the allocation data repository 322 for a matching allocation record 323. A snapshot of the allocation record may be created and attached to the portion of the transaction tracing data that describes the observed allocation. Variant embodiments may, instead querying a matching allocation record and storing a copy of it in the transaction trace data, only store the allocation type data in the transaction monitoring data, which may then be used later, i.e., during an analysis on the monitoring server, to query a corresponding allocation record.

FIG. 10b provides a flow chart that conceptually describes the execution of an allocation sensor 1001. The process starts with step 1010, when a monitored transaction performs an allocation which triggers the execution of the allocation sensor.

In following step 1011, the allocation sensor may create monitoring data describing the performed allocation, like the time when the allocation was performed or values of parameters that were used to initiate the allocated object. The created allocation monitoring data may be added to the transaction monitoring data of the surrounding monitored transaction.

Afterwards, step 1012 may be executed in which the allocation sensor may acquire allocation type data, e.g., in form of data describing the type of the allocated object and data describing the location of the performed allocation, e.g., in form of call stack data. Step 1012 may use the create allocation type data to query the allocation data repository 322 for a matching allocation record 323.

Following step 1013 may then create a copy of the allocation record 323, to preserve the state of its allocation quantity data 328 at the time of the observed allocation. The created allocation data snapshot may then be added to the transaction monitoring data of the enclosing transaction. In case no matching allocation record 323 was found by step 1012, step 1012 may otherwise adapt the transaction monitoring data to indicate that no allocation record for the observed allocation was available at the time of the observed allocation.

In subsequent step 1014, the agent may send the transaction monitoring data which is now enriched with allocation statistic data for the performed allocation to the monitoring server. The process then ends with step 1015.

Coming now to FIG. 11, which provides the flow chart of an exemplary analysis process to identify groups of transaction executions that are probably related to undesired garbage collection behavior, like too frequent or long-lasting garbage collection runs.

The process starts with step 1110, when an analysis to identify groups or types of transactions that are most probably related to undesired garbage collection activity on a specific process is requested by a user of the monitoring system. Alternatively, such an analysis may also be triggered when a specific metric that describes garbage collection activity (e.g., collection frequency, average collection duration) exceeds a threshold.

Following step 1111 may then fetch transaction trace data of transactions that were at least partially executed by the specific process and for which allocation statistic data is available. If a monitoring approach as described in FIG. 9 was used, step 1111 may e.g., first fetch allocation records 323 for the specific process and then use the "allocating transaction identifiers" stored in those allocation records to fetch corresponding transaction trace data. For a monitoring approach as described in FIG. 10, step 1111 may select those transaction traces which contain allocation statistic data in form of allocation record snapshots.

Following step 1112 may then group the fetched transaction trace data by specific properties. As an example, the fetched transaction traces may be grouped by the services that they used to enter the specific process.

Subsequent step 1113 may, for each group of transactions identified by step 1112, perform a separate analysis of the allocation statistic data corresponding to the transactions in the group (i.e. allocation records with containing an "allocating transaction identifiers" of one of the transaction traces in the group, if recording was performed according to FIG. 9, or allocation record snapshots contained in transaction traces of the group if recording was performed according to FIG. 10). Those per transaction group analyses may be performed as already described in FIG. 8. Step 1113 may identify transaction groups with an overall allocation behavior that most probably causes frequent garbage collection runs (i.e., high amount of allocated bytes) or long-lasting collection runs (i.e., high amount of survived bytes). Step 1113 may further select the transaction groups with the highest garbage collection impact (i.e., highest count of allocated/survived bytes).

Following step 1114 may then present the selected transaction groups, together with the properties that define those transaction groups and the specific, undesired garbage collection impact (high frequency or long-lasting) they cause to a user of the monitoring system.

The process then ends with step 1115.

Although the above-described embodiments are closely related to the Java virtual machine environment, also various other execution environments that use garbage collection based heap memory management approaches may benefit from the disclosed allocation monitoring and analysis technologies. Example environments include the Microsoft .NET® framework, Google Go® programming environment, or the Node.js environment.

However, the possibility to create an allocation monitoring system as described herein strongly depends on the allocation and deallocation notifications and monitoring interfaces provided by those environments. Providing monitoring data that enables an application operator to quickly identify the root cause of undesired behavior is a high-priority goal for all vendors of application platform, therefore monitoring interfaces are constantly improved and extended to meet this goal. Currently, the .NET environment seems to provide the best allocation monitoring features after the Java environment. The .NET profiler interface "ICorProfilerCallBack" e.g., provides the interface "ObjectAllocated" for allocation notifications. Alternatively, "EventPipe" events of the type "GCAllocationTick" may be used for allocation notifications. Events like "MovedReferences" or "SurvivingReferences" inform about the objects that the garbage collector moved to a new location or that survived a garbage collection run. The provided events, notifications and monitoring interfaces that are provided by the .NET environment are sufficient to implement an allocation monitoring system as described herein. The allocation monitoring interfaces of other environments may also fulfill those environments already or may do so in a future version.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware, or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

What is claimed is:

1. A computer-implemented method to identify objects with memory allocations which cause undesired garbage collection in a distributed computing environment, comprising:

receiving, by an agent, object allocation notifications from a garbage collecting memory management system, where the object allocation notifications identify object allocations in a heap memory and the agent is instrumented into a process being monitored on a host computing device;

for each object allocation notification received from the garbage collecting memory management system, registering with the memory management system to receive an object collection notification for a given object, determining a number of garbage collection runs for the given object at the time the given object is allocated, and determining a memory allocation size for the given object, where the object allocation notification identifies the given object and the object collection notification indicates deallocation of the given object;

receiving, by the agent, object collection notifications from the memory management system;

for each object for which an object collection notification was received from the memory management system, determining a number of garbage collection runs for a given object at the time the given object is deallocated, and determining a number of garbage collection runs that occurred between allocation and deallocation of the given object based on the number of garbage collection runs for the given object at the time the given object is allocated and the number of garbage collection runs for a given object at the time the given object is deallocated;

from amongst objects for which an object collection notification was received from the memory management system, determining objects with a highest survived garbage collection size, where the survived garbage collection size for a given object is calculated by the agent as product of the number of garbage collection runs that occurred between allocation and deallocation of the given object and the memory size allocated to the given object; and presenting the objects with the highest survived garbage collection size to an operator.

2. The method of claim 1 further comprises creating, by the agent, a plurality of allocation records in a repository using information from the object allocation notifications, where each allocation record includes an identifier for a type of allocated object and accumulated memory allocation data for objects of the type, and the repository resides on the host computing device;

extracting, by the agent, an identifier for the type of allocated object from the object collection notification;

retrieving, by the agent, a given allocation record from the repository using the identifier for the type of allocated object; and updating, by the agent, the accumulated memory allocation data of the given allocation record based on the object collection notification.

3. The method of claim 2 wherein updating the accumulated memory allocation data of the given allocation record includes incrementing an accumulated count of survived garbage collection runs in the accumulated memory allocation data of the given allocation record by the number of garbage collection runs that occurred between allocation and deallocation of the given object.

4. The method of claim 2 wherein updating the given allocation record includes incrementing an accumulated count of garbage collection survived bytes in the accumulated memory allocation data of the given allocation record by the calculated survived garbage collection size.

5. The method of claim 1 further comprises from amongst objects for which an object collection notification was received from the memory management system, determining object types with the largest allocation size; and presenting the object types with the largest allocation size to an operator.

6. The method of claim 2 further comprises sending, by the agent, the plurality of allocation records to an allocation data analyzer, where the allocation data analyzer presents the objects with the highest survived garbage collection size to an operator and resides on a monitoring server located remotely from the host computing device.

7. The method of claim 2 further comprises receiving a plurality of allocation records for different time periods;

grouping the plurality of allocation records into groups having the same type of allocated object;

for each group, merging the allocation records in a given group into a merged allocation record.

8. The method of claim 1 further comprises receiving, by the agent, a particular object allocation notification from the memory management system, where the particular object allocation notification identifies allocation of a particular object;

determining, by the agent, an identifier for a transaction executed by the monitored process that allocates the particular object; and updating, by the agent, a given allocation record with the identifier for the transaction that allocates the particular object, where the given allocation record corresponds to the allocation of the particular object.

9. The method of claim 6 further comprises monitoring, by a sensor instrumented in an application, memory allocations performed during execution of a transaction;

capturing, by the sensor, identifying data for the memory allocations; and correlating, by the sensor, the data identifying the memory allocations with data describing the transaction which performed the memory allocation; and sending, by the sensor, the correlated data to the monitoring server.

10. A computer-implemented method to identify allocation sites which cause undesired garbage collection in a distributed computing environment, comprising:

receiving, by an agent, object allocation notifications from a garbage collecting memory management system, where the object allocation notifications identify object allocations and the agent is instrumented into a process being monitored on a host computing device;

for each object allocation notification received from the garbage collecting memory management system, registering with the memory management system to receive an object collection notification for a given object, determining a number of garbage collection runs for the given object at the time the given object is allocated, and determining a memory allocation size for the given object, where the object allocation notification identifies the given object and the object collection notification indicates deallocation of the given object;

receiving, by the agent, object collection notifications from the memory management system;

for each object for which an object collection notification was received from the memory management system, determining, by the agent, code location data for code responsible for allocating a given object;

for each object for which an object collection notification was received from the memory management system, determining a number of garbage collections runs for a given object at the time the given object is deallocated, and determining, by the agent, a number of survived garbage collection runs based on the number of garbage collection runs for the given object at the time the given object is allocated and the number of garbage collection runs for a given object at the time the given object is deallocated;

from amongst objects for which an objection collection notification was received from the memory management system, determining objects with a highest survived garbage collection size, where the survived garbage collection size for a given object is calculated by the agent as product of the number of garbage collection runs survived by the given object and the memory size allocated to the given object;

from amongst objects for which an object collection notification was received from the memory management system, determining allocation sites with the highest survived garbage collection size; and presenting the allocation sites with the highest survived garbage collection size to an operator.

11. The method of claim 10 wherein the code location data is defined as call stack data for a thread responsible for allocating the given object.

12. The method of claim 10 further comprise determining the call stack data for the given object from corresponding object allocation notification.

13. The method of claim 10 further comprises determining the call stack data for the given object by retrieving the call stack data using an identifier for the thread responsible for allocating the given object.

14. The method of claim 10 further comprises
creating, by the agent, a plurality of allocation records in a repository on the host computing device using information from the object allocation notifications, where each allocation record includes an identifier for a type of allocated object, an identifier to a site from which the object was allocated, and accumulated memory allocation data for the object type and the allocation site;
extracting, by the agent, an identifier for the type of allocated object and for the site from which the object was allocated from the object collection notification;
retrieving, by the agent, a given allocation record for the allocated object from the repository using the extracted identifier; and
updating, by the agent, the given allocation record using the number of garbage collection runs survived by the given object.

15. The method of claim 14 wherein updating the accumulated memory allocation data of the given allocation record includes incrementing a count of garbage collection runs survived by the given object in the given allocation record.

16. The method of claim 14 wherein updating the given allocation record includes calculating a survived garbage collection size for the given object by extracting the memory size of the given object from the object collection notification, multiplying the extracted memory size by the number of garbage collection runs survived by the given object and incrementing an accumulated count of garbage collection survived bytes in the accumulated memory allocation data of the given allocation record by the calculated survived garbage collection size.

17. The method of claim 13 further comprises sending, by the agent, the plurality of allocation records to an allocation data analyzer, where the allocation data analyzer presents the objects with the highest survived garbage collection size to an operator and resides on a monitoring server located remotely from the host computing device.

18. The method of claim 13 further comprises
receiving a plurality of allocation records for different time periods;
grouping the plurality of allocation records into groups having a same type of allocated object and the same allocation site;
for each group, merging the allocation records in a given group into a merged allocation record.

19. The method of claim 10 further comprises
receiving, by the agent, a particular object allocation notification from the memory management system, where the particular object allocation notification identifies allocation of a particular object;
determining, by the agent, an identifier for a transaction executed by the monitored process that allocates the particular object; and
updating, by the agent, a given allocation record with the identifier for the transaction that allocates the particular object, where the given allocation record corresponds to the allocation of the particular object.

20. The method of claim 10 further comprises monitoring, by a sensor instrumented in an application, memory allocations performed during execution of a transaction; capturing, by the sensor, identifying data for the memory allocations; and correlating, by the sensor, the data identifying the memory allocations with data describing the transaction which performed the memory allocation; and sending, by the sensor, the correlated data to the monitoring server.

21. The method of claim 1 further comprises monitoring, by an allocation data analyzer, a metric describing duration of garbage collections for an application;
retrieving, by the allocation data analyzer, a plurality of allocation records for a specified period of time, where the retrieval is in response to the metric exceeding a threshold and each allocation record includes an identifier for a type of allocated object, size of memory allocated by objects of the type, and survived garbage collection size which is proportional to product of a number of garbage collection runs survived by object of the type and the memory size allocated by object of the type, where the specific period of time is derived from the period of time where the metric exceeded the threshold;
grouping, by the allocation data analyzer, the plurality of allocation records into groups having the same type of allocated object;
for each group, merging, by the allocation data analyzer, the allocation records in a given group into a merged allocation record;
from the merged allocation records, determining, by the allocation data analyzer, object types with a highest survived garbage collection size; and
presenting, by the allocation data analyzer, the object types with the highest survived garbage collection size to an operator.

22. The method of claim 1, where determining the number of garbage collection runs further includes, maintaining, by the agent, an allocation record for an object type of the given object, where the allocation record contains a counter for survived garbage collection runs; receiving, by the agent, notifications for garbage collection runs; and incrementing, by the agent, the counter for survived garbage collection runs on the receipt of a garbage collection notification.

23. The method of claim 1, where the object allocation notification is one of a plurality of object allocation notifications received by the agent;
where object allocation notifications are generated by the memory management system for a randomly selected sample of memory allocations according to a notification configuration;
where the agent monitors the number of notifications received during a specific time period and compares the number of received notifications with a desired number of notifications for the specific time period;
in response to a deviation between monitored and desired number of notifications exceeding a specific threshold, updating by the agent, the notification configuration.

24. The method of claim 1 where the object allocation notifications are not received for object allocations that are substituted by scalar replacements in a stack memory of methods performing the object allocations.

* * * * *